(12) United States Patent
Tizhoosh et al.

(10) Patent No.: US 8,391,603 B2
(45) Date of Patent: Mar. 5, 2013

(54) SYSTEM AND METHOD FOR IMAGE SEGMENTATION

(75) Inventors: Hamid Reza Tizhoosh, Aurora (CA); Farhang Sahba, Richmond Hill (CA); Maryam Shokri, Toronto (CA)

(73) Assignee: OMISA INc., Toronto, Ontario (CA)

( * ) Notice: Subject to any disclaimer, the term of this patent is extended or adjusted under 35 U.S.C. 154(b) by 718 days.

(21) Appl. No.: 12/487,428

(22) Filed: Jun. 18, 2009

(65) Prior Publication Data

US 2010/0322489 A1    Dec. 23, 2010

(51) Int. Cl.
G06K 9/34    (2006.01)
G06K 9/00    (2006.01)

(52) U.S. Cl. ....................... 382/179; 382/128

(58) Field of Classification Search .................. None
See application file for complete search history.

(56) References Cited

U.S. PATENT DOCUMENTS

| | | | |
|---|---|---|---|
| 6,167,146 | A | 12/2000 | Rogers et al. |
| 7,336,809 | B2 | 2/2008 | Zeng et al. |
| 2006/0058605 | A1* | 3/2006 | Deischinger et al. ......... 600/407 |
| 2008/0112614 | A1 | 5/2008 | Fluck et al. |
| 2008/0193006 | A1 | 8/2008 | Udupa et al. |
| 2009/0028403 | A1* | 1/2009 | Bar-Aviv et al. .............. 382/128 |

OTHER PUBLICATIONS

Sahba, F., Tizhoosh, H.R., Salama, M.M.M.A.: A reinforcement agent for object segmentation in ultrasound images. Expert Syst. Appl. 35(3), 772-780 (2008).*
F Sahba,H.R.Tizhoosh,M.M.Salama,A coarse-to-fine approach to prostate boundary segmentation in ultrasound . images,Biomedical Engineering Online 4 (2005) 58.*
International Preliminary Report on Patentability dated Oct. 14, 2011, issued in corresponding International Application No. PCT/CA2010/000893 (7 pages).

* cited by examiner

Primary Examiner — Nirav G Patel
(74) Attorney, Agent, or Firm — Westerman, Hattori, Daniels & Adrian, LLP

(57) ABSTRACT

A method of segmenting images receives an image (such as a medical image) and a segment in relation to the image, displays them to an observer, receives a modification to the segment from the observer, and generates a second segment in relation to a second image, responsive to the modification. An image segmentation system includes a learning scheme or model to take input from an observer feedback interface and to communicate with a means for drawing an image segment to permit adjustment of at least one image segmentation parameter (such as a threshold value). The learning scheme is provided with a knowledge base which may initially be created by processing offline images. The learning scheme may use any scheme such as a reinforcement learning agent, a fuzzy inference system or a neural network.

44 Claims, 19 Drawing Sheets

196

196

SYSTEM AND METHOD FOR IMAGE SEGMENTATION

FIELD OF THE INVENTION

The present invention relates to the field of image processing, and more particularly to a system and method for segmentation of images such as medical diagnostic and treatment-planning images.

BACKGROUND OF THE INVENTION

There are a number of medical and veterinary imaging technologies. Such technologies include x-ray, ultrasound, computed tomography (CT), magnetic resonance imaging (MRI), positron emission tomography (PET) and others.

Radiologists and other health care professionals review images in order to provide analysis and advice for diagnosis, treatment and palliation. It is a common task and activity in reviewing images to create or identify a segment of a part of a presented image. Such a segment may help to identify, or may identify, objects, contours, boundaries or surfaces of interest. Examples of these include the location of anatomical structures, or the relationship or relative positive of anatomical structures. Segments of interest could also include or indicate the location, shape and size of pathological objects, such as tumors, lesions, organs, tissues, cells, etc. For the purposes of this patent "segmenting" or "segmentation" and similar words mean any of the tasks or activities described in this paragraph.

In reviewing and segmenting images, radiologists and other health care professionals are often not as productive as desired.

Some images are difficult to segment. The object, boundary or contour of interest may be difficult to differentiate from surrounding or other portions of the image. Different health care professionals will often segment such difficult images in different ways.

There are previously existing technologies purported to assist with segmentation or provide automated segmentation. These previously existing technologies have a number of drawbacks. One of these drawbacks is they do not learn, or they learn ineffectively (e.g. requiring a large training set), how an individual would like to approach the segmentation task. This limitation or disadvantage of the prior art and prior uses can be particularly evident when an attempt is made to automate the segmentation of a difficult image. This results in lower productivity, as well as other undesired effects such as fatigue or annoyance of the person creating the segment.

SUMMARY OF THE INVENTION

According to the invention, there is disclosed a computer-implemented method of segmenting images comprising the steps of: receiving an image; receiving a segment in relation to the image; displaying to an observer the image and the segment; receiving from an observer a modification to the segment; receiving a second image; and generating a second segment in relation to the second image, said generation responsive to the modification received from the observer.

There is also disclosed a computer-implemented method of segmenting images comprising the steps of: receiving an image; receiving at least one initial segmentation parameter; receiving an initial segment in relation to the image from the at least one initial segmentation parameter; receiving at least one segment feature in relation to the initial segment; providing the at least one initial segmentation parameter and the at least one segment feature to a learning model, said learning model thereby generating a revised at least one segmentation parameter; generating a revised segment from the revised at least one segmentation parameter; displaying the image and the revised segment; receiving observer feedback in relation to the revised segment to create a modified segment; recalculating the at least one segmentation parameter from the modified segment; and updating the learning model from the recalculated at least one segmentation parameter, the at least one segment feature, and the at least one initial segmentation parameter.

Moreover, according to the invention, there is also disclosed a system for segmenting images comprising: a receiver module, for receiving an image; a segmentation module for receiving a segment in relation to the image; a display, for displaying to an observer the image and the generated segment; a receiver module, for receiving from an observer a modification to the generated segment; wherein said segmentation module is responsive to the modification received from the observer.

In another aspect of the invention, there is disclosed an image segmentation system comprising: means for drawing an image segment based on at least one segmentation parameter; an observer display, for displaying the drawn segment; an observer feedback interface; and a learning scheme which takes input from the observer feedback interface and communicates with the means for drawing an image segment to permit adjustment of the at least one segmentation parameter.

According to an aspect of the invention, the learning scheme of the image segmentation system is provided with a knowledge base. According to this aspect of the invention, the knowledge base may be initially created by: receiving at least one offline image, containing a segment provided by an observer; predicting a segment for the at least one offline image using the learning scheme; comparing the predicted and provided segments for the at least one offline image; and updating the learning scheme with the result of the comparison.

According to an aspect of one preferred embodiment of the invention, the learning scheme of the image segmentation system comprises a reinforcement learning scheme. More preferably, the reinforcement learning scheme comprises a Q-learning scheme which generates the at least one segmentation parameter from at least one image feature and provides a reward or a punishment to itself in response to an action comprising a change of the at least one segmentation parameter.

According to an aspect of an alternative preferred embodiment of the invention, the learning scheme of the image segmentation system comprises a fuzzy inference system. More preferably, the fuzzy inference system re-generates a rule base to output the at least one segmentation parameter from at least one image feature.

According to an aspect of a further alternative preferred embodiment of the invention, the learning scheme of the image segmentation system comprises a neural network. More preferably, the neural network re-trains one or more aspects of the neural network to output the at least one segmentation parameter from at least one image feature.

According to an aspect of the preferred embodiment of the invention, the image segmentation system further comprises a means to generate m telescoping windows from an initial segment or point to calculate image features. Preferably, the means to generate m telescoping windows starts with the initial segment or point and constructs enlarged windows until a maximum window size is reached. In a preferred embodiment, the at least one image features comprise the following image features: a threshold $T_m$ in each $m^{th}$ telescoping window; a homogeneity of each $m^{th}$ telescoping window; a difference $D_m$ between the homogeneity of each $m^{th}$ telescoping window and a homogeneity of the initial segment or point; and a ratio of average gray-levels for each telescoping window and an average of gray-levels of the initial segment or point.

According to an aspect of the preferred embodiment of the invention, the image is a medical diagnostic image.

According to another aspect of the preferred embodiment of the invention, the means for drawing an image segment comprise an interface to permit the observer to generate an image segment over a display comprising: tracking an observer-operated pointer over an image; analysing the image in a vicinity of the pointer; displaying a segment in the vicinity of the pointer on the display responsive to the analysing step; and receiving a segment selection from the observer.

In an aspect of the invention, the at least one segmentation parameter includes a threshold value. Alternatively, the means for drawing an image segment are based on a single segmentation parameter. Furthermore, the single parameter may be a threshold value.

According to another aspect of the preferred embodiment of the invention, the image segmentation system may further comprise a means to identify a conflict between the learning scheme and the modification; and means to prompt the observer to overwrite the learning scheme.

Table 1 is a listing of the pseudo code for real time segmentation for use with an image segmentation system according to an aspect of a preferred embodiment of the present invention;

Table 2 is a listing of the pseudo code for threshold telescoping for use with an image segmentation system according to an aspect of a preferred embodiment of the present invention;

Table 3 is an example feature table for use with an image segmentation system according to an aspect of a preferred embodiment of the present invention;

Table 4 is a sample learning matrix for use with an image segmentation system according to an aspect of a preferred embodiment of the present invention;

Table 5 is a listing of the pseudo code for Q-learning reinforcement learning scheme for use with an image segmentation system according to an aspect of a preferred embodiment of the present invention; and Table 6 is an example of learning matrix rows for use with an image segmentation system according to an aspect of a preferred embodiment of the present invention.

DETAILED DESCRIPTION

The present invention provides one or more of the following benefits:
(A) improve the productivity of image segmentation;
(B) provide a system that will learn how an individual would like to approach, or approaches, segmentation and apply this learning to future automated segmentation;
(C) improve the accuracy of automatically generated image segments;
(D) reduce fatigue of the person carrying out the segmentation;

(E) reduce the time required to segment an image;
(F) enable faster processing of medical image segmentation; or
(G) allow for more consistent segmentation, as compared to a manual method.

Figure 1:
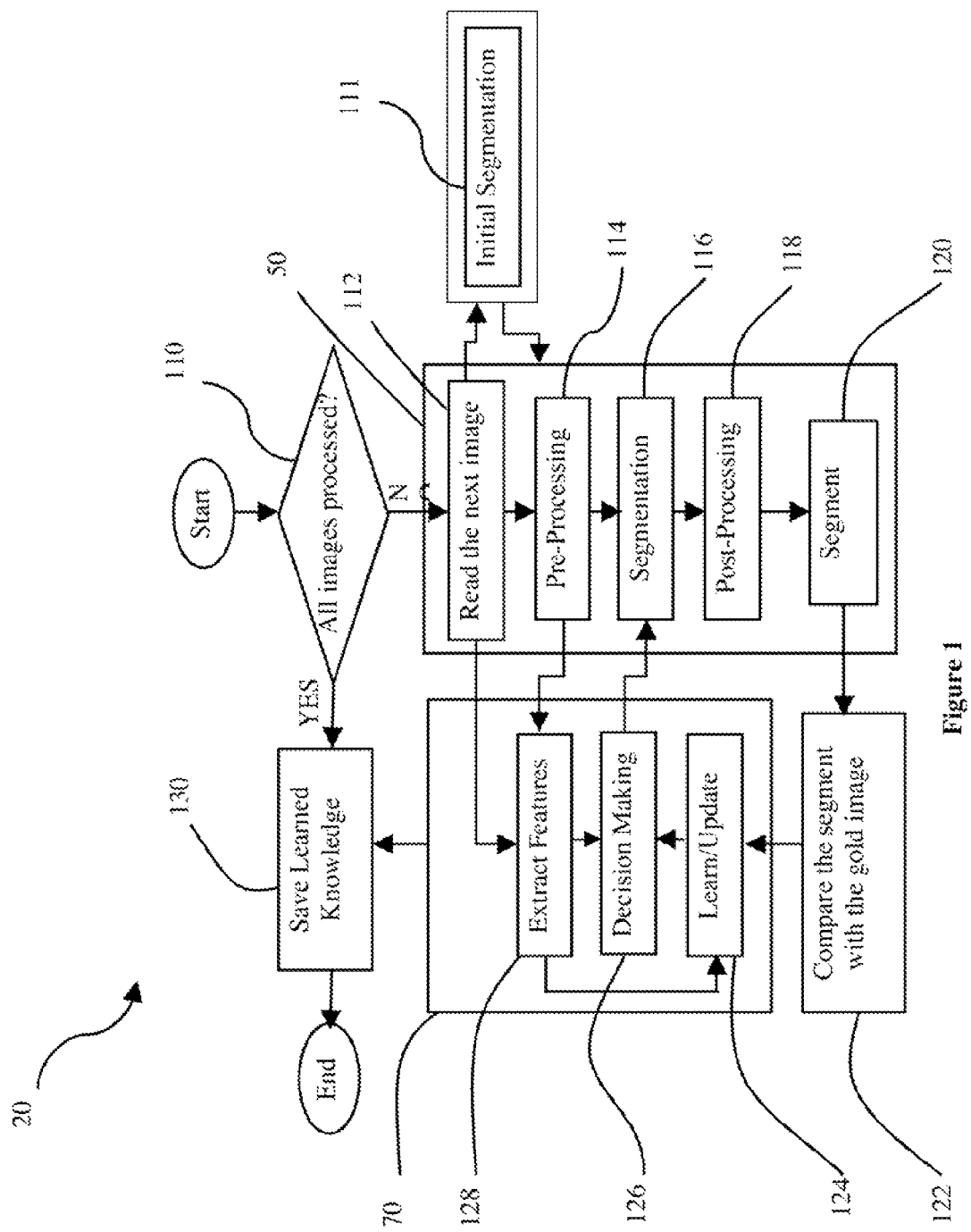
FIG. 1 is a simplified diagrammatic representation of an image segmentation system according to a preferred embodiment of the present invention, in offline mode.
Figure 2:
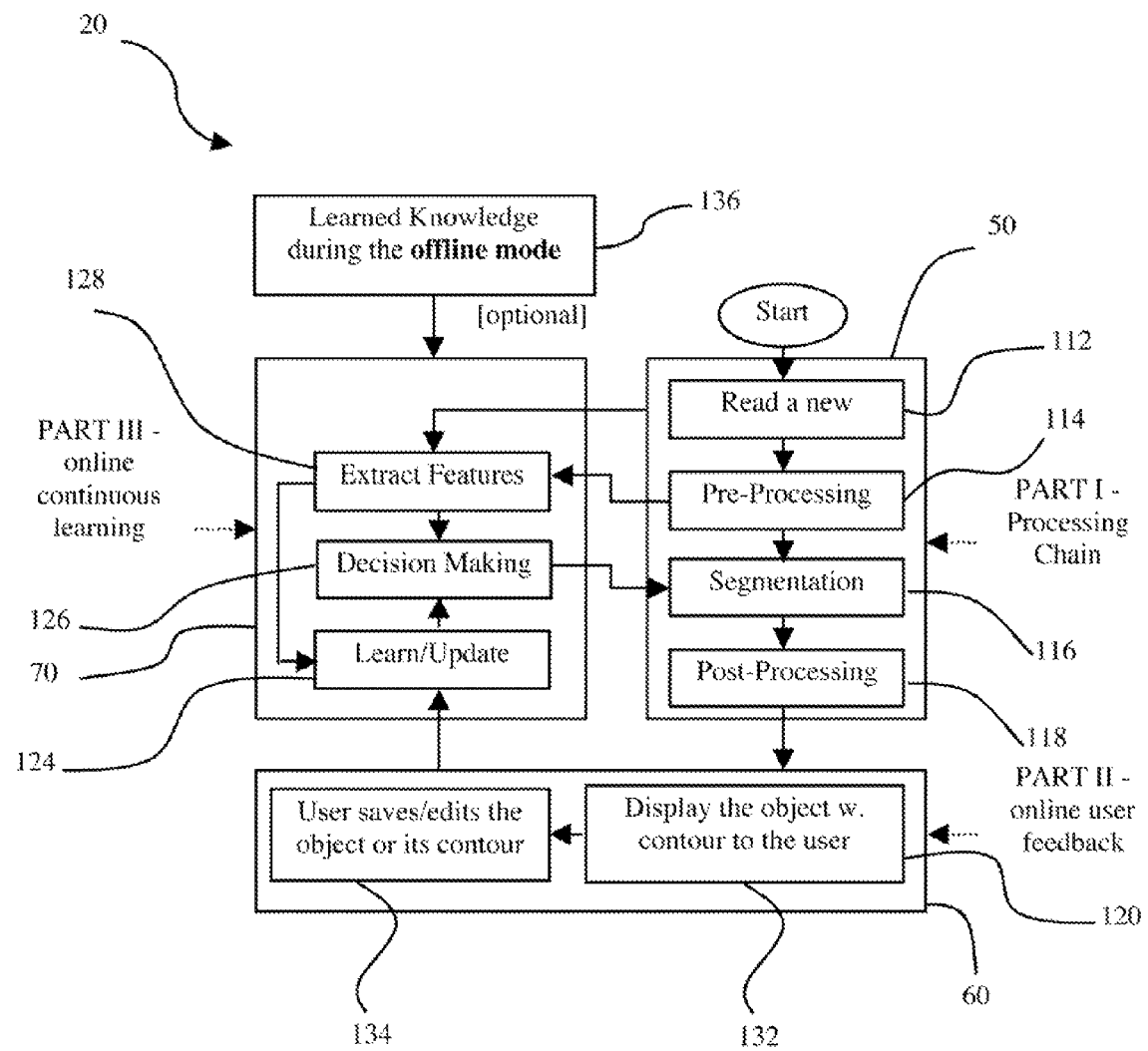
FIG. 2 is a simplified diagrammatic representation of an image segmentation system according to a preferred embodiment of the present invention, in online mode.

Referring now to FIGS. 1 and 2 of the drawings, there is shown a simplified image segmentation system 20 according to the present invention. In FIG. 1, the system 20 is shown having an environment 30 which is in offline mode, and in FIG. 2, the environment 30 is in online mode. The purpose of the system 20 is to control the processing of digital images to extract or generate segments or contours of interest. Use of the term "digital image" or "image" encompasses a two-dimensional array (matrix) of numbers (generally between 0 [black] and 255 [white]) representing a snapshot from the real world. Every point in such a matrix is called a pixel.

Figure 3:
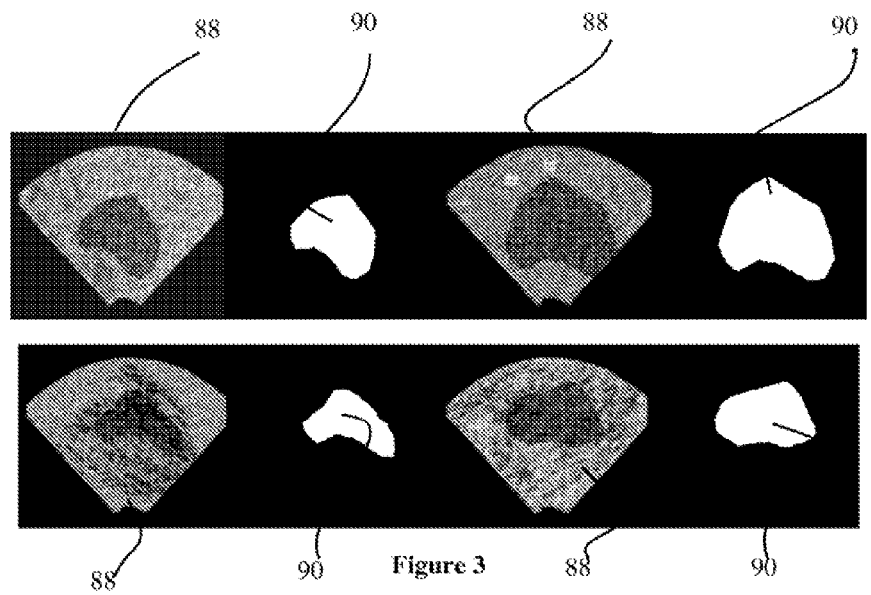
FIG. 3 is a series of sample synthetic prostate ultrasound images and corresponding ground-truth (gold) images.

As will be discussed, and as shown in FIG. 1, observer-supplied gold images 90 may be employed in either environment 30 to improve the quality of system-generated segment 120. Example gold images 390 are shown in FIG. 3 beside synthetic/phantom sample images 88 simulating a prostate ultrasound. Gold images 90 are a sample segmentation/delineation prepared, corrected or approved by an observer 40 (i.e. a clinical user or observer such as a radiologist or other clinician or technologist, or anyone who performs medical image analysis) from the sample images 88 (i.e. as opposed to a machine-generated segmentation/delineation). Use of the term "object" includes a connected collection of pixels in a digital image. In medical imaging, objects are lesions, tumours, organs, tissue types or other areas of interest. Use of the term "contour" includes a shape, line, boundary or curve. Use of the phrase "segmentation/delineation" refers to marking objects in digital images by assigning a certain value/color to all pixels belonging to that object, or by marking the pixels that are on the border/outline of the object. In general, segmentation can be understood to be, or is equivalent to, the delineation/extraction/marking/outlining/contouring of an object.

Still with reference to FIGS. 1 and 2, the system 20 produces a knowledge base 130 regarding how an observer 40 approaches the segmentation task. As shown in FIG. 2, in online mode, an observer 40 (not shown) interacts with the system 20 by providing observer feedback 60 as input to an online continuous learning scheme 70.

Figure 14:
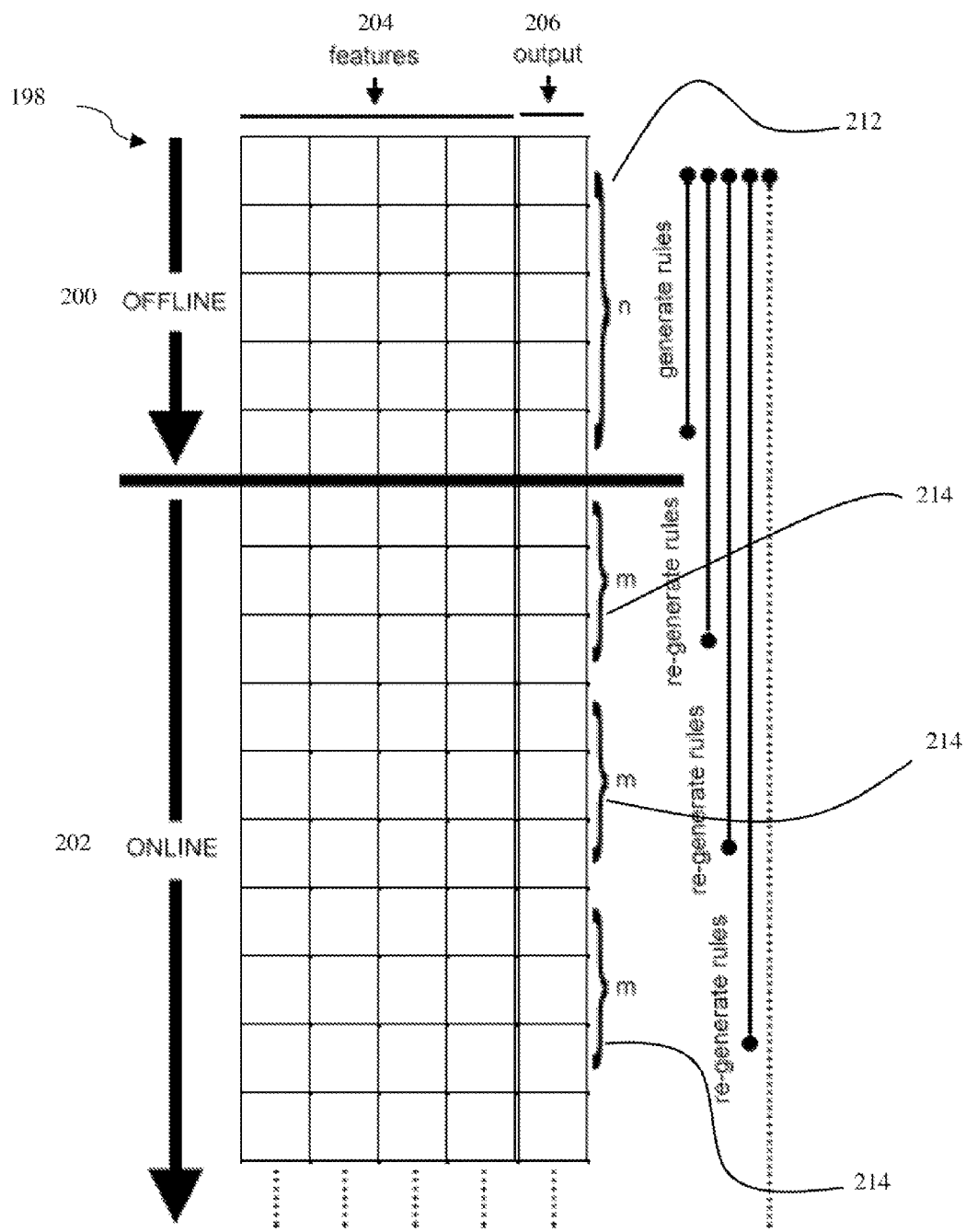
FIG. 14 is a simplified diagrammatic representation of the fuzzy inference scheme of FIG. 12.
Figure 17:
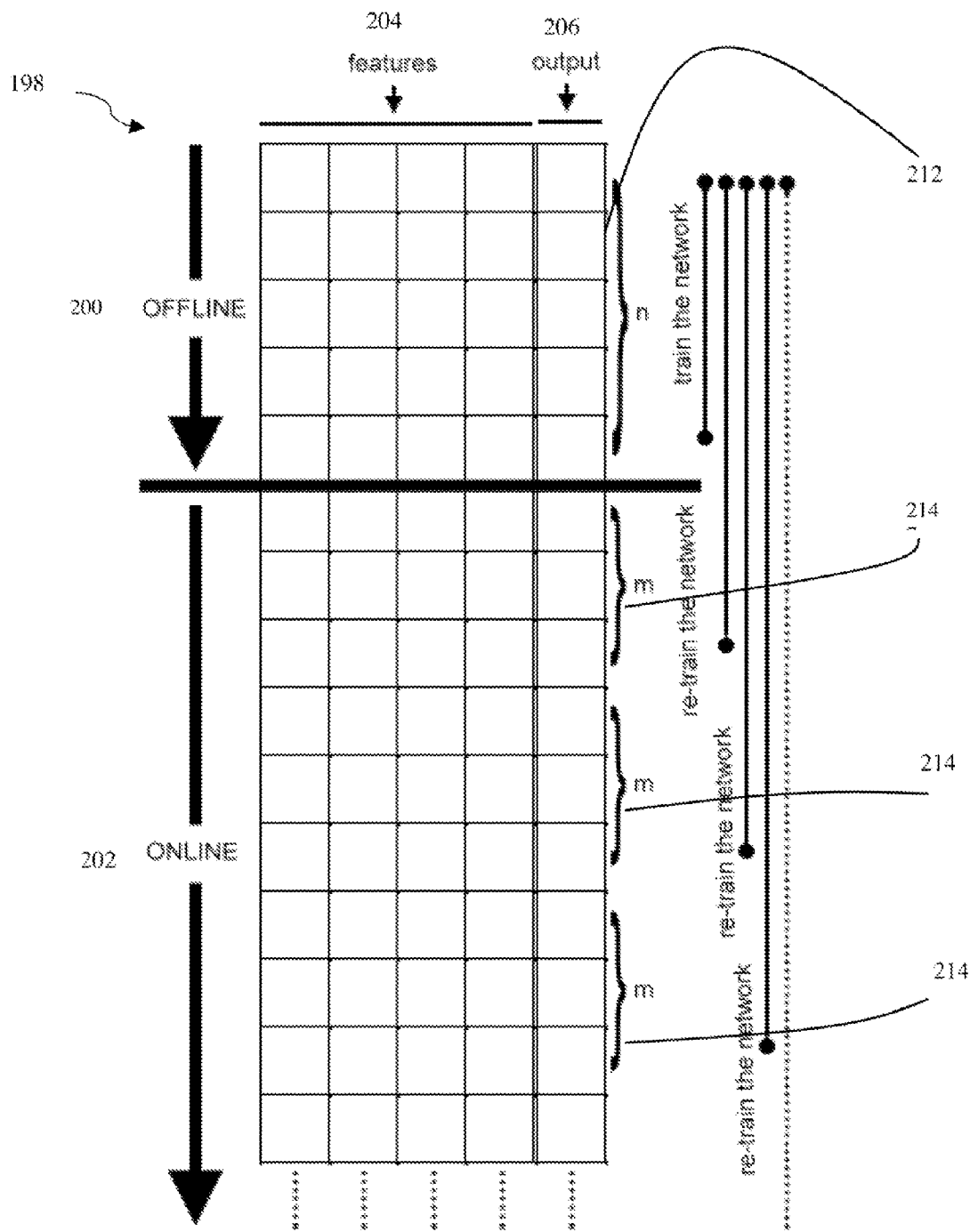
FIG. 17 is a simplified diagrammatic representation of the neural network scheme of FIG. 15.

The precise structure of knowledge base 130 as stored in the system 20 will depend on the choice of learning scheme 70. Preferably, and as will be described in further detail below, the knowledge base 130 includes a learning matrix 198 (for example, as represented in FIGS. 14 and 17), and a supporting database 199 (not shown). The knowledge base 130 is preferably stored in a database. Where the learning scheme 70 is a reinforcement learning scheme, the supporting database 199 is a matrix. Where the learning scheme 70 is a fuzzy inference system, the supporting database 199 is a number of rules. And, where the learning scheme 70 is a neural network, the supporting database 199 is information about weights and connections. Other learning schemes 70 may be employed without departing from the scope of the present invention. In a preferred embodiment, the results, output or performance of two or more learning schemes 70 may be evaluated by components of the system 20 not shown, and one selected based on requirements such as speed or accuracy. The structure of the knowledge base 130 is generally the same regardless of the environment 30 being online or offline.

The system 20 can start in offline mode when sample images 88 along with gold images 90 are available, and then carry on in online mode as an observer 40 interacts with the system. If a number of sample images 88 have been processed in offline mode, the knowledge base 130 may, in a preferred embodiment, then be used by the system 20 in online mode.

Generally, the system 20 creates or updates the knowledge base 130 by processing the available sample images 88 (along with their gold image 90) to learn how to automatically adjust a segmentation for a new image. Preferably, the system 20 adjusts one or more segmentation parameters whereby increasing or decreasing the value of the parameter causes the resulting segmentation to be visibly different. In a preferred embodiment, the segmentation parameter to be adjusted is the image threshold (described in more detail below). Other segmentation parameters may be employed, such as similarity measures including region growing.

By processing each image 88 through a processing chain 50, a result is given which may then be compared to an observer-supplied gold image 90. Then, the selected learning scheme 70 is updated by inputting the result of the comparison to create or update the knowledge base 130.

Still with reference to FIGS. 1 and 2, the processing chain 50 may comprise the following steps: reading each image 112, pre-processing each image 114 (e.g. filtering, enhancement), generating a segment in respect of each image 116, post-processing each image 118 (e.g. cleaning the segmented image and extracting the object/contour of interest). As mentioned, a system-generated segment 120 is produced as output. The processing chain 50 may be an already existing chain provided by a third party. After processing, the system-generated segment 120 is presented against a gold image 90 and compared 122. Taking the result of the comparison, the online continuous learning scheme 70 learns/updates 124, makes a decision 126 and extracts features 128. The resulting knowledge base 130 is the output of the system 20.

Preferably, the system-generated segment 120 should be changeable via at least one parameter of the processing chain 50, a parameter, which when varied can change the system-generated segment 120 producing a different object/contour.

The knowledge base 130 may be available as input to the system 20 in online mode, shown as 136 in FIG. 2. However, the system 20 can be used without any offline training. Generally, the effect of learning is apparent after some time since the system 20 is to receive user feedback prior to generating segmentations automatically. The number of cases required to obtain enough experience depends on the image modality and the complexity of the corresponding object of interest.

With reference to FIG. 2, in online mode, rather than compare to an observer-supplied gold image 90, the system 20 provides an interface for the observer 40 to view an automatically generated object/contour 132 and modify the system-generated segment 120 if desired (e.g. shown in FIG. 2 as save/edit object/contour 134). Preferably, the system 20 displays the system-generated segment 120 to the observer 40 either as an image with certain levels of intensities/colors, or as a contour superimposed on the original image. In a preferred embodiment, the observer 40 has the possibility to edit the system-generated segment 120 in three possible ways thereby providing observer feedback 60: a) the observer 40 adds new pixels to or removes pixels from the system-generated segment 120; b) the observer 40 edits the superimposed contour by dragging some of its points to desired positions via mouse movements in order to optimally delineate the object boundaries; or c) the observer 40 draws or redraws parts of the object via mouse. Other input devices or methods of obtaining user feedback 60 may also be used. The observer 40 may also save the segmented object without any change/editing as well.

Preferably, the system 20 uses the edited/saved object (pixel-based or contour-based) by the observer 40 as observer feedback 60 in order to permanently and continuously train and re-train a learning scheme 70. This observer feedback 60, namely the system-generated segment 120 if acceptable or edits thereto if not acceptable, is equivalent to a gold image 90 for the purpose of learning/updating 124 in the online continuous learning scheme 70. Notably, the system 20 continues to learn online regardless of whether the observer 40 "saves" the result unchanged or changed. The observer feedback 60 (namely, these "observer-generated" gold images) are the result of image/contour editing—the observer 40 either saves the result unchanged (if the object delineation meets his or her expectations) or he or she edits the pixels/contour and then saves it. In either case a new gold image 90 is created for use by the system to adjust the processing chain 50.

A notable characteristic of the system 20 is the integration of observer feedback 60 (FIG. 2) with standard image processing such as standard medical image processing. The observer feedback 60 may comprise a pixel-based or contour-based manipulation of the system-generated segment 120 (to show a tumor, lesion, organ, tissue, cell etc.), no matter how the system-generated segment 120 has been obtained. The processing chain 50 (FIG. 2) may be customized for different modalities (e.g. MRI, ultrasound) depending on the nature of the problem at hand. The selection of appropriate pre-processing steps (e.g. filtering/enhancement), an appropriate segmentation technique, and suitable post-processing steps (e.g. cleaning/smoothing) are decisions made by those of skill in the art. For example, with ultrasound images, there are well-known ways to remove noise or enhance the image prior to segmentation 116.

The learning scheme 70 employs the observer feedback 60 (the saved result with or without changes of the observer 40) to continuously adjust one or more parameters of the processing chain 50 (preferably a segmentation parameter) to adjust the result of segmentation 116 to the observer 40's preferences. Diverse learning schemes 70 (learning schemes or intelligent techniques) such as clustering, rule-based inference, learning or optimization methods may be employed.

The system 20 calculates or extracts features 128 (sometimes called attributes) from the sample image 88, the gold image 90, and the extracted contour to characterize each image to be segmented and contour.

The system 20 generates a segment 120 that is observer-oriented. In one embodiment, the difference or overlap between the system-generated segment 120 and the observer-edited result 134 (i.e. the gold image 90) guides the adjustment to the learning scheme 70. The system 20 can use any clustering, rule-based or learning technique to classify the features 128 and to control/fine-tune the segmentation parameter(s) using the online feedback 60 (the edited/saved object). In a preferred embodiment, the features 128 along with the gold image 90 constitute a learning matrix 198 which increases over time as the observer 40 works with the system 20. By editing/manipulating objects/contours to generate gold images 90 in online mode, the system 20 continuously learns from the observer 40 via learning schemes 70 and indefinitely learns how a particular observer 40 would like to approach the segmentation task.

In embodiments of the present invention, the learning scheme 70 may alternatively comprise reinforcement, online re-generation of rules 210 (fuzzy inference) or online re-training (neural networks) in order to integrate the observer feedback 60 into the processing chain 50. The observer feedback 60 generates learning/training samples such that the performance/accuracy of system-generated segment 120 can be adjusted or improved incrementally. However, the system 20 can be configured to use any clustering, rule-based, optimization or learning technique to classify the image features 128 and to imitate the preferences of the observer 40 in respect of the segmented object or its contour.

In a preferred embodiment of the present invention, the system 20 provides a user interface for the observer 40 to input a real time initial segment 113.

In a preferred embodiment of the present invention, the system 20 also provides a system-generated segment 120 by acquiring a set of thresholds for each image or sub-images of each image (via an initial segment 113 or with a single position, e.g. one click). One advantage of acquiring a set of thresholds for each image is that the learning scheme 70 may be provided with numerous pieces of information about the same image.

In a preferred embodiment of the present invention, the system 20 calculates the features 128 based on the initial segment 113 and telescoping windows 150 (described below) to characterize each threshold 152 associated with each telescoping window 150.

Preferably, the system 20 can be used for any given modality of imagery 42 (e.g. magnetic resonance, ultrasound) and any given diagnostics/treatment case 44 (e.g. prostate, brain etc.). Hence, the system 20 may be oriented to the triple of the observer 40, the modality 42, and the case 44 (not shown). For example, <Dr. Smith, Magnetic Resonance, brain> and <Dr. Goldstein, Computer Tomography, colon> are instances of <observer 40, modality 42, case 44>.

In the following paragraphs, an example is given in relation to medical image segmentation with a learning scheme 70 using observer feedback 60.

Intelligent Control of Image Thresholding

The system 20 may process all available images in the following way: 1) A standard Median filtering such as is described in [GON07] is performed in 3×3 neighbourhoods to eliminate noise; 2) contrast adjustment is carried out by a simple stretching as described in [GON07] excluding the background, 3) thresholding using telescoping (as described below) and threshold weighting is performed; 4) all white pixels are labelled in order to identify the object pixels; 5) an object is extracted to isolate the object from irrelevant pixels; and 6) any holes inside the object are removed using morphological filters as described in [GON07], and the object outline is smoothed. Generally, the steps 1-6 above correspond to the processing chain 50 of FIGS. 1 and 2 whereby steps 1-2 are pre-processing 114, steps 3-5 are segmentation 116, and step 6 is post-processing 118.

Initial Segmentation

In a preferred embodiment, to facilitate the object extraction and lay the foundation for extracting the features 128, the system 20 may use an initial segmentation interface 111 to acquire an initial segment 113 from the observer 40. The initial segment 113 may be generated by commercially available segmentation programs or preferably, by employing real-time interaction as is described next. Preferably, the initial segmentation interface 111 employs real-time interaction as follows (use of the term "real-time" refers to information or events being updated as they occur but need not be instantaneous): 1) the observer 40 moves the mouse pointer over the selected image 138 as shown in FIG. 4; 2) at every mouse position the system 20 analyzes the pixels in the vicinity of the current mouse location; 3) the system either shows a reasonable segment 142 (if one can be easily identified), as described below, or displays a suitable geometrical shape such as rectangle or ellipse if a reliable segmentation is not possible, e.g. ellipse 144 shown in FIG. 4 (a reasonable segment 142 is any segment that satisfies the fundamental requirements derived from the domain knowledge—these can be size-related constraints (the segment size should fall within a pre-defined interval of minimum and maximum size), or shape-related (the segment shape is expected to be rather regular/irregular)); 4) in case that an ellipse 144 or rectangle 148 is displayed, the observer 40 may use the initial segmentation interface 111 to place it anywhere, rotate it and change its size to get a good match with the object area and then finalize the selection (e.g. by mouse movements or double clicking or other techniques known to those skilled in the art); 5) the observer 40 may also be given the option to manually draw a suitable geometrical shape such as an ellipse 144 or rectangle 148 around the object of interest and then finalize the selection (e.g. by mouse movements or double clicking or other techniques known to those skilled in the art); 6) this initial segment 113 (which is either a segment or an elliptical/rectangular region) may be used in subsequent steps to segment the image 116, extract the object and calculate necessary features 128 for the learning scheme 70.

Figure 4:
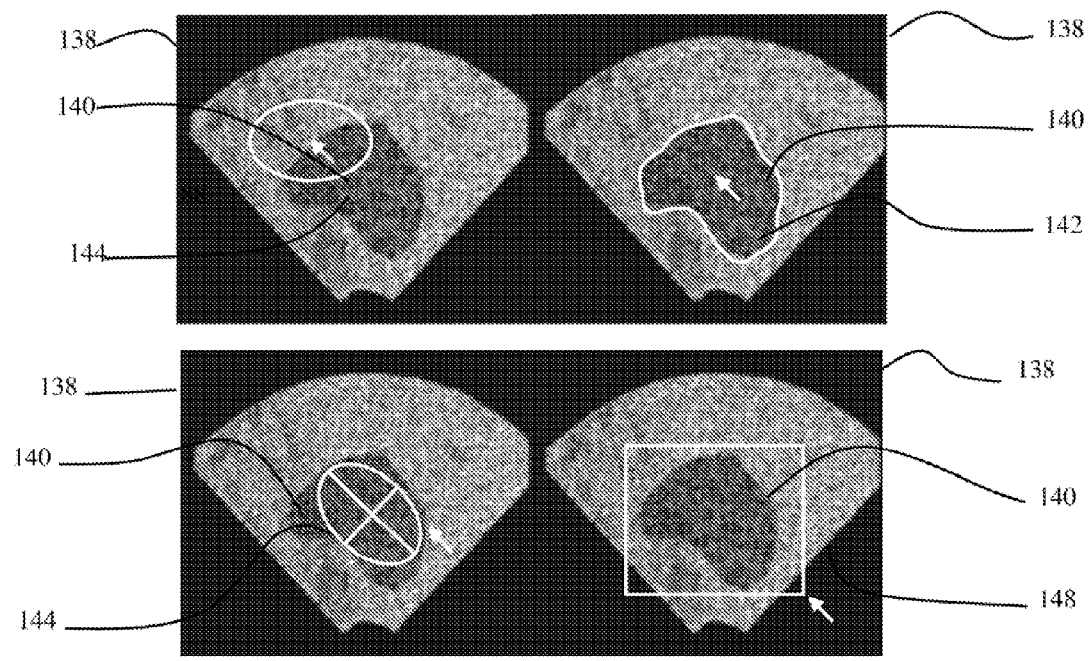
FIG. 4 is a series of screenshots of a user interface of an image segmentation system according to a preferred embodiment of the present invention.

As shown in FIG. 4, in operation, as the observer 40 moves the mouse cursor/pointer over the displayed image, the initial segmentation interface 111 either displays an ellipse 144 or rectangle 148 (or other suitable shape, as the case may be) when segmentation is not possible (top left image of FIG. 4), or it directly segments the image and shows the contour of the object (top right image of FIG. 4). The observer 40 can change the size of the ellipse 144 or rectangle 148, place it anywhere and rotate it to capture a large portion of the object (bottom left image of FIG. 4). Preferably, the observer 40 has the option to manually draw an ellipse 144 or rectangle 148 around the object of interest (bottom right image of FIG. 4). The contour of the selected/extracted object will be delivered to the next processing unit of the system 20 (namely the processing chain 50) to be used as an initial segment 113 for a more accurate segmentation.

Figure 6:
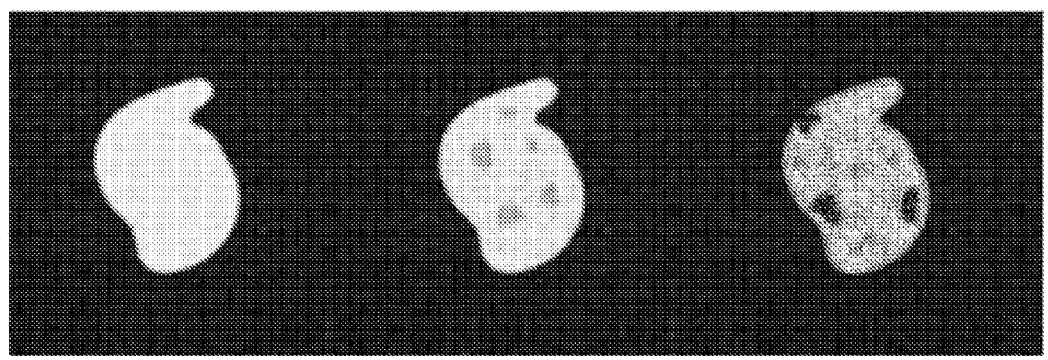
FIG. 6 is an illustration of images with varying levels of homogeneity, for use with an image segmentation system according to a preferred embodiment of the present invention.

According to a preferred embodiment of the present invention, the initial segment 113 is based on an assessment of homogeneity. The homogeneity indicates the extent to which the pixels underneath the current position of the mouse are homogenous (i.e. similar to each other). FIG. 6 illustrates three images in which the objects of interest have variable levels of homogeneity—it will be appreciated that as object homogeneity decreases, segmentation typically becomes more difficult.

There are numerous ways to calculate the homogeneity. A simple equation such as the following may be used:

$$H = 1 - \min\left(1, \frac{\sigma(S_{sub})}{\Delta_{dev}}\right)$$

In which the standard deviation $\sigma(S_{sub})$ of all pixels of a sub-image $S_{sub}$ indicates a number in the range [0,1] by normalizing it via dividing by $\Delta_{dev}$. According to this equation, high homogeneity would indicate easy segmentation (in which case an initial segmentation interface 111 will try to extract a segment via a simple thresholding scheme) and low homogeneity indicates either a difficult segmentation or a region for which there is no segment. FIG. 6 illustrates objects with varying levels of homogeneity. An object with low homogeneity (right hand image of FIG. 6) shows great variation in pixel intensity within the object compared with an object with higher homogeneity (left hand image of FIG. 6). In other words, the pixel intensities within the right hand object in FIG. 6 indicate a higher standard deviation. In such a case, the initial segmentation interface 111 will display an ellipse 144 or other suitable geometric shape and permit the observer 40 displace it, rotate it or change its size. A listing of the pseudo-code for initial segmentation is given in Table 1.

The result of the initial segmentation interface 111 is a binary image containing the initial segment 113, which is either a reasonable segment 142 (regardless of its accuracy) or an ellipse 144 or rectangle 148, or other suitable geometric shape. The initial segment 113 may be stored as a binary image (pixels) or as a contour (x/y coordinates).

Example for Segmentation

Different techniques for image segmentation 116 in the processing chain 50 of the system 20 may be selected. Preferably, the segmentation technique is a thresholding technique to binarize the filtered and enhanced image. An advantage of thresholding is that it is completely dependent on a single parameter, that is, the proper threshold value. Although in general more than one parameter could be used, the computational complexity is reduced when only a single parameter is operated upon, which allows faster computation and an improved experience in online mode. Although any thresholding technique may be used, preferably a telescoping technique is used. A listing of the pseudo-code for threshold telescoping is appended in Table 2.

Figure 5:
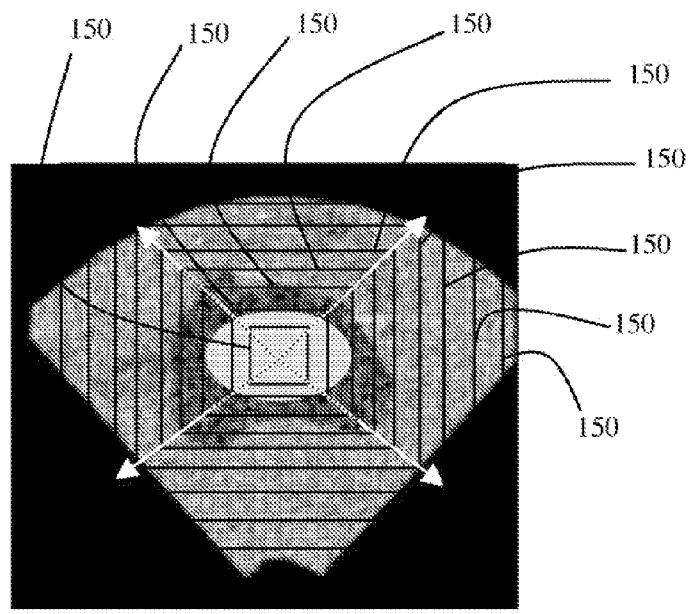
FIG. 5 is a representation of an image segmentation system according to a preferred embodiment of the present invention, with telescoping windows shown.

Telescoping starts by constructing a window (such as a rectangle) inside the initial segment 113. Starting from this first window, incremental enlargements to this rectangle are made until the original image size is reached. FIG. 5 illustrates the principle of these telescoping windows 150. Alternatively, telescoping may start from a single point, in cases where an initial segment 113 has not been provided due to application-specific reasons—for example, when minimal observer interaction is desired. This single point is preferably provided by a mouse click from the observer 40 inside the object of interest.

Each telescoping window 150 constitutes a sub-image for which a threshold is calculated using a pre-determined method (for example, any existing thresholding algorithm can be used). Notably, online adjustment of the threshold value is compatible with any method or technique for calculating individual thresholds.

A thresholding method that accepts an original image or its histogram as input and returns a number between 0 and 255 (or between 0 and 1 in case of normalized images) can be used. In such a case, the results of telescoping will be n thresholds $T_1, T_2, \ldots, T_n$, for n sub-images, where the first few thresholds may be calculated inside the object and the few last thresholds may be for sub-images completely containing the object.

The result of telescoping is a set of different threshold values $T_1, T_2, \ldots, T_n$. To assist in the adjustment of the threshold level, a set of weights $w_1, w_2, \ldots, w_n$ is defined, to quantify the significance of each threshold for different images or sub-images which may contain different types of objects with respect to their size, regularity and homogeneity. The final (optimal) threshold $T^*$ for the initial segment 113 is calculated according to $$T^* = \frac{\sum_{i=1}^{n} w_i T_i}{\sum_{i=1}^{n} w_i}$$

Figure 8:
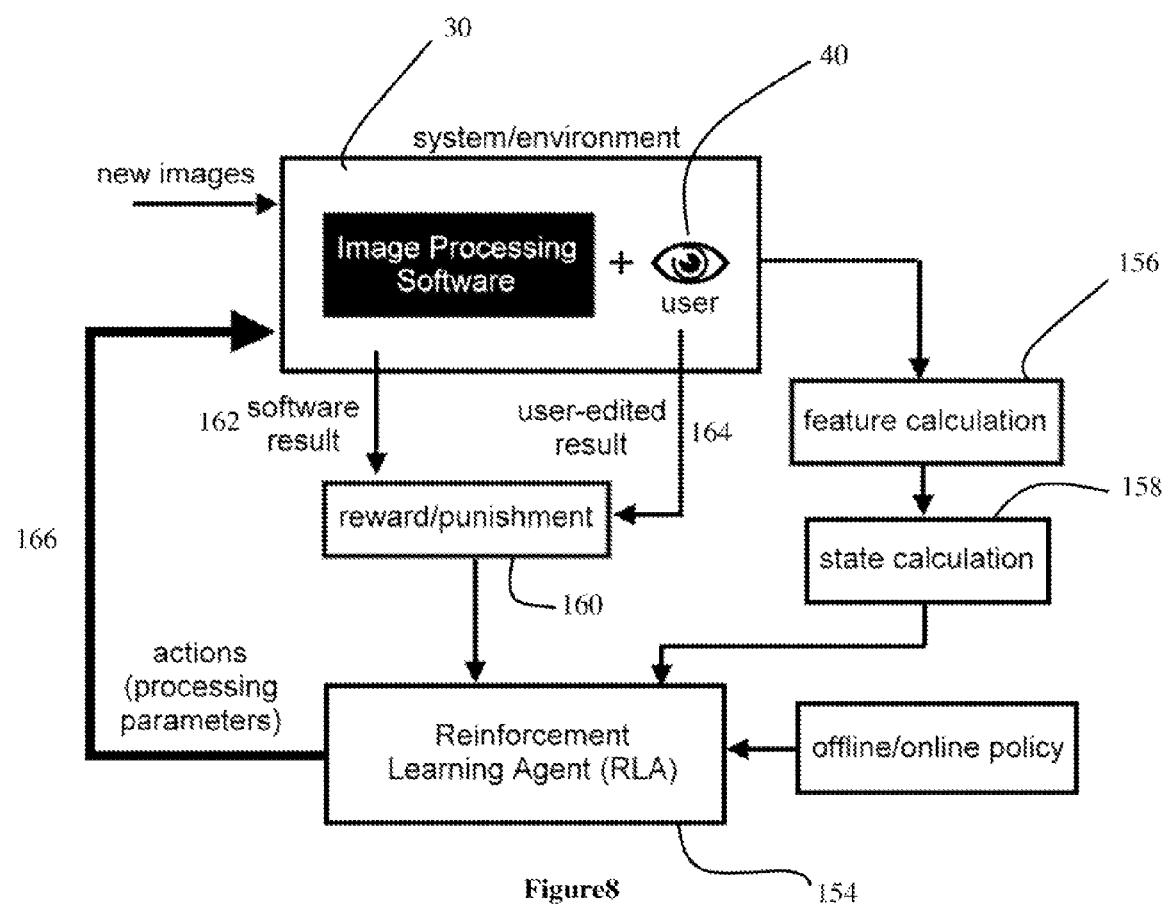
FIG. 8 is a simplified diagrammatic representation of a reinforcement learning scheme for use with an image segmentation system according to an aspect of a preferred embodiment of the present invention.

Telescoping may be used on its own as a segmentation technique only, or in combination with the learning scheme 70. For example, where all the weights are equal ($w_1 = w_2 = \ldots = w_n = 1$), the average of the thresholds may be calculated as a standard segmentation method (no learning involved). Alternatively, the weight function, which will controls the adjustment, can be any similar function with $f(T_1) = f(T_n) = 0$ and $f(T_C) = 1$, as is shown in FIG. 8. The weights can be assigned also via integration of domain knowledge. For smaller darker objects the Gaussian can be skewed to the left, and for larger brighter object the Gaussian can be skewed to the right.

Figure 7:
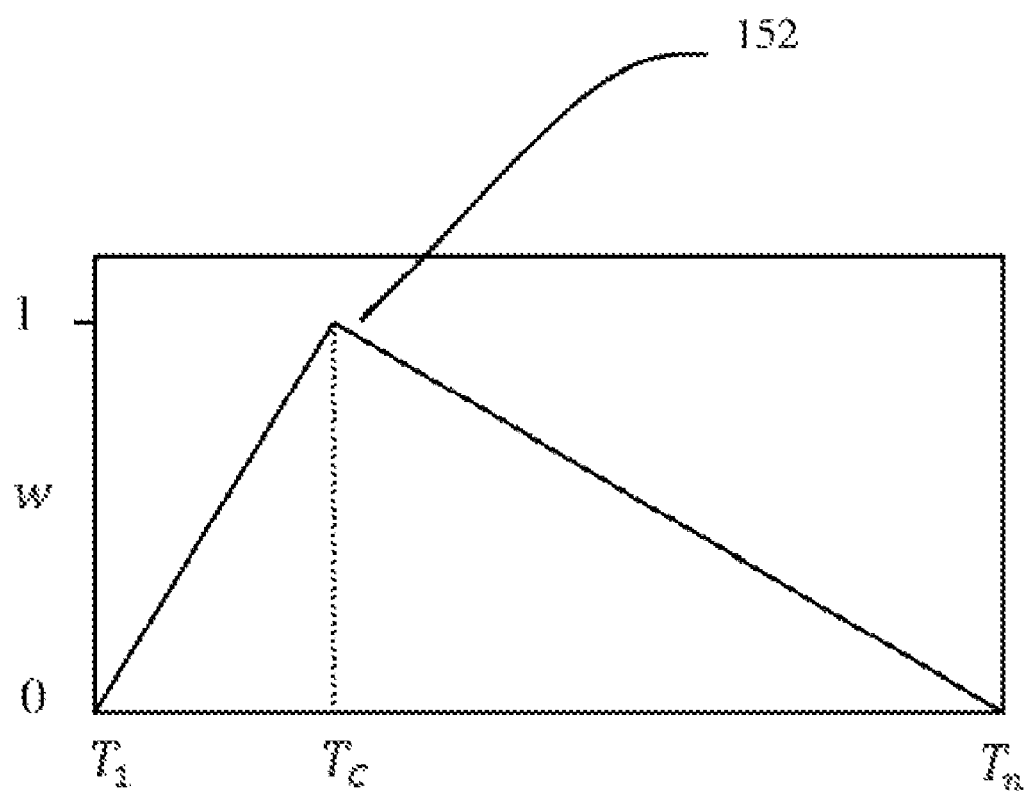
FIG. 7 is a chart of sample weight assignments provided by a threshold telescoping method for use with an image segmentation system according to a preferred embodiment of the present invention.

Preferably, a flexible triangular function as depicted in FIG. 7 is used where the position of the $T_C$ can change depending on image characteristics. A bell-shaped or Gaussian-shaped function may alternatively be used. Preferably, as shown in FIG. 7, the thresholds $T_1, T_2, \ldots, T_C, \ldots, T_{n-2}, T_{n-1}, T_n$ provided by telescoping receive weights based on the assumption that only one of them receives the highest weight. The triangular function used here can be replaced with other functions such as a Gaussian one with $f(T_1) = f(T_n) = 0$ and $f(T_C) = 1$.

The aim of the learning scheme 70 is to determine $T_C$ properly for <observer 40, modality 42, case 44>, such as, for instance <Dr. Smith, ultrasound, prostate>. To achieve this, the system 20 extracts features 128 as described in the following section.

The input image can be thresholded (binarized) using T* to generate a binary image. The contour of this binary image, after cleaning (removing irrelevant white pixels), is then extracted and superimposed on the original image and displayed to the observer 40 (alternatively the extracted object can be displayed in a different distinct color). As described above, the observer 40 then either accepts the results or manipulates/edits the segment if he/she is not satisfied with the accuracy of the delineation. For this purpose the observer 40 may be presented with standard editing functions to cut/add parts of the object, smooth the curve or change the size of the object.

Example for Feature Calculation

To effectively recognize objects and control segmentation, the learning scheme 70 must be provided with features 128 (or attributes) which can characterize different objects/images. In a preferred embodiment, and for telescoping and initial segmentation, the system 20 calculates or extracts the following four features 128:

1. The threshold $T_m$ in the $m^{th}$ telescoping window 150, is calculated according to the selected thresholding technique.

2. The homogeneity of the $m^{th}$ telescoping window 150 is calculated by the equation below. Homogeneity is a measure indicating how homogeneous an image or an image region is; if all pixels have the same value, then homogeneity will be maximum.

$$H_m = \frac{\max(I_m) - \min(I_m)}{\max(I)}$$

Where $I_m$, means the m-th telescoping window/sub-image and I means the original image.

3. The difference $D_m$ between the homogeneity of each telescoping window 150 and the homogeneity of the initial segment 113 is calculated by the equation below. The homogeneity of telescoping windows 150 will be mostly different from the homogeneity of the initial segment 113 depending on the size of the initial segment 113 and the actual size of the object. Hence the homogeneity difference between subsequent telescoping windows 150 provides valuable information where a significant change occur.

$$D_m = \left| \frac{\max(I_m) - \min(I_m)}{\max(I)} - \frac{\max(I_{init}) - \min(I_{init})}{\max(I)} \right|$$

Where Iinit means the sub-image created by a rectangle around the initial segment 113.

4. The ratio $R_m$ of average gray-levels $g_{ij}^{TW}$ for each telescoping window 150 and the average of gray-levels $g_{ij}^{INIT}$ of the initial segment is calculated by the equation:

$$R_m = \frac{\frac{1}{N_{TW}} \sum_j \sum_i g_{ij}^{TW}}{\frac{1}{N_{INIT}} \sum_j \sum_i g_{ij}^{INIT}}$$

Hence, the system 20 characterizes each image by nfeature rows as shown in the appended Table 3.

Observer-Oriented Optimality

After a set of features describing each image have been calculated or extracted, the next step of the invention is to generate the appropriate threshold value.

The system and method functions to set the threshold $T_C$ to calculate the weights for all telescoping thresholds.

The optimal threshold is the one that minimizes the difference between the segmented image B (provided by the software) and the observer-generated gold image G. In one embodiment of the present invention, a learning matrix 198 is generated and stored for each triple of observer 40, imaging modality 42, and case 44]. An example of the learning matrix 198 is shown in Table 4. The learning matrix 198 contains, for each image, features values for each telescoped sub-image. The fifth column in the learning matrix 198, ideal action, would be then the optimal threshold T*, which is the same for all telescoping features (regardless of the size of initial segment 113 and the size of different telescoping windows, the software should deliver the best threshold for that image). The optimal threshold can be easily calculated by trying other values lower/higher than calculated threshold depending on whether the extracted object is larger/smaller than the object in the gold image. Hence, the learning matrix 198 contains n training data for m image, as shown in TABLE 4.

In following sections different methods are presented of how the learning matrix 198 can be employed by different algorithms alternatively implemented in the invention in order to learn from the editing habits of the observer 40 and to adjust the segmentation parameter(s) accordingly are described.

Reinforcement Learning

Reinforcement learning is a machine intelligence technique based on principle of "learning through interaction". A reinforcement learning agent 154 may interact with a system/environment 30 in order to optimize its output. The general structure of a reinforcement learning agent 154 is depicted in FIG. 8. The system to be controlled by the reinforcement learning agent 154 is the system 20 and its interaction with the observer 40 who evaluates the results.

With reference to FIG. 8, the general structure of a reinforcement learning agent 154 is illustrated. As apparent from FIG. 8, the system/environment 30 to be controlled is the image processing system 20 including the observer 40 who provides feedback on the performance of the system 20. The reinforcement learning agent 154 observes the state of the system 20 and takes proper actions 166 in order to optimize the system performance. The reinforcement learning agent 154 receives reward/punishment 160 for each action 166. Over time the reinforcement learning agent 154 finds out which actions 166 are the best for which states of the system 20 such that better results can be generated. The reward/punishment 160 that reinforcement learning agent 154 receives from the system 20 is the guiding force to learn the optimal actions 166.

The state of a system 20 or environment 30 provides information about how well the system 20 is functioning and can be characterized by significant features/attributes of the system 20 (shown in FIG. 8 as feature calculation 156). The actions 166 constitute practical ways to manipulate the system 20 in order to change its behaviour. Reward/punishment 160 provides information (shown in FIG. 8 as user-edited result 164 compared with software result 162) about how well the action 166 taken by reinforcement learning agent 154 was with respect to output optimality.

To use reinforcement learning the system 20 needs to 1) define the states (representing the inputs), 2) define the actions (representing the outputs), 3) define the way reward/punishment can be determined (representing the guiding force behind the learning), and 4) select a learning algorithm.

Defining the states (referred to in FIG. 8 as state calculation 158): each of the nfeatures (e.g. 4 features T, H, D, R) as shown in Table 4, is discretized at m levels resulting in $m^n$ different states. For instance for m=5 different discrete levels there will be 625 different states for the n=4 features previously described. A feature with values in the range [0,1] can be approximated in 5 levels if a simple linear discretization is used: [0,0.2]≡case 1, (0.2,0.4]≡case 2, (0.4,0.6]≡case 3, (0.6, 0.8]≡case 4, (0.8,1.0]≡case 5
Other discretization procedures, including non-linear procedures, may be used to define the states.

Defining the actions 166: The action 166 taken by the reinforcement learning agent 154 is to change the value of parameter(s) of the segmentation such that a different (better) result can be generated. The action 166 in the example is to determine a threshold $T_i$ to be used for weight calculation (FIG. 5). Hence, there are 256 possible actions since a 8 bit gray level images with $2^8$=256 possible values for each pixel is being operated on.

Determining the reward/punishment signal (shown in FIG. 8 as reward/punishment 160): The reward/punishment signal, which is a numerical value, is used to generate T* from the states (which are based on feature values). The system 20 can calculate the difference between the software result 162—a binary image B—and the observer-edited result G(shown in FIG. 8 as 164)—also a binary image. If the observer 40 saves the result without any changes, then the difference between B and G is zero and the highest reward will be returned. In contrast, if the observer 40 edits/manipulates the software result 162 and then saves it, then there will be a substantial difference between B and G resulting in punishment. The reward/punishment can be defined in [0,1] or [−1, +1], for example, where the lowest value is generally understood as being punishment (i.e. the lowest reward is considered to be punishment).

Figure 9:
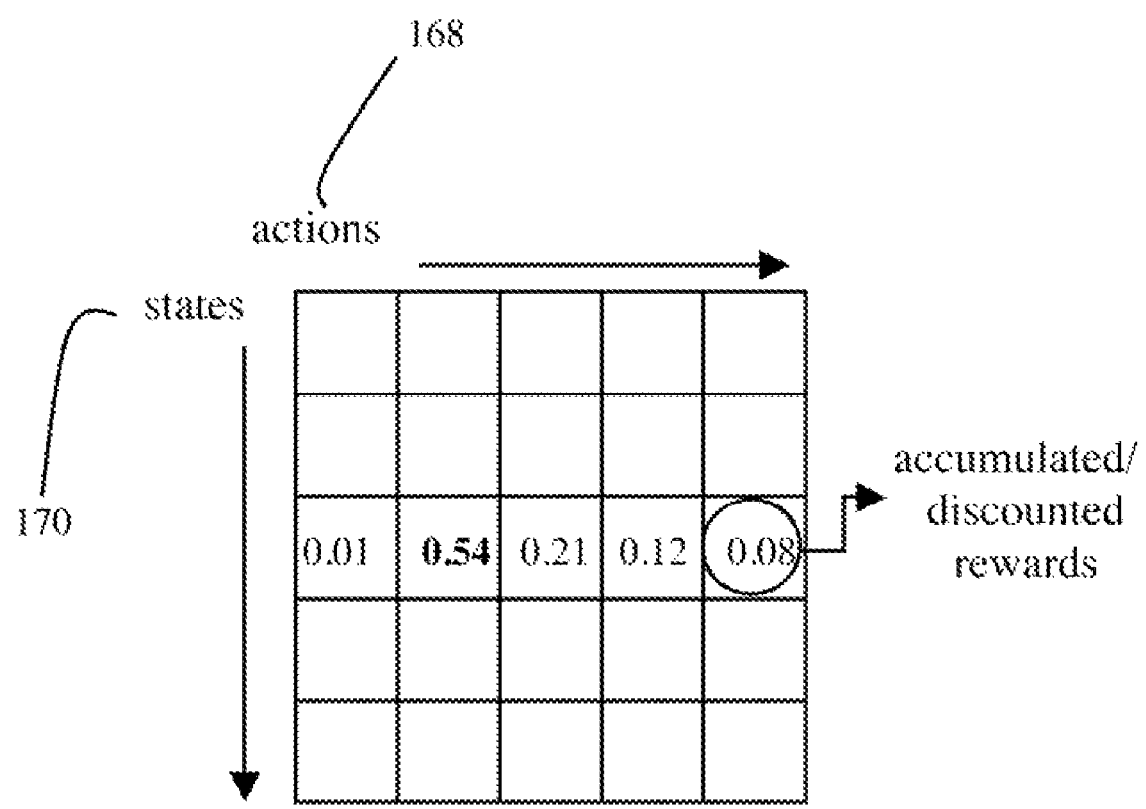
FIG. 9 is a simplified tabular representation of a Q-learning reinforcement learning scheme for use with an image segmentation system according to an aspect of a preferred embodiment of the present invention.

Selecting the learning algorithm: reinforcement learning is a general scheme for learning and can be implemented using different reinforcement algorithms. One of the most popular reinforcement methods is Q-learning. With reference to FIG. 9, Q-learning uses the states 170 and actions 168 to define a matrix, called Q-matrix, containing the accumulated and discounted rewards. A listing of the pseudo-code for Q-learning to adjust a threshold, based on observer-edited results, is shown in TABLE 5.

In an embodiment of the present invention, a matrix A of size 625×256 can be used as a Q-matrix to adjust its values via a reinforcement learning algorithm such as Q-learning, as described in [WAT92, KAE96]. The 625 cases constitute the states s (which are based on features) and the 256 actions constitute the action set. In order to accelerate the learning, especially if m(the discretization level) is high, opposition-based reinforcement can be used to make multiple updates. The algorithm is described in TABLE 5.

As seen in FIG. 9, an exemplary Q-matrix is shown. Rows indicate states 170 and columns indicate actions 168. Each cell contains the accumulated/discounted rewards, which is calculated based on update equation presented in the listing of pseudo-code in TABLE 5. For each state one or more actions may have the highest value (the gray cell) indicating the best action for that state.

The learning capability is inherent to the reinforcement learning since reward/punishment 160 is always available; in offline mode immediately and in the online mode after the observer 40 saves or edits the results since what is being learned can be used for the next image. To accelerate the learning the following measures may be used:

1. Knowledge-Based Initialization—The Q-matrix is initialized with meaningful values instead of random numbers. For instance, high values may be assigned to certain threshold range based on knowledge of the processing chain and the general characteristics of the images to be thresholded. For example, if the expected threshold is expected to be in the middle of the dynamic range [0,255] due to the contrast distribution of the pre-processed images, then for each state low values (=0) can be assigned to thresholds close to 0 and 255, and high values (=1) to thresholds around 128.

2. Intensification of Offline Training—During the offline training numerous cases for each image are created by purposeful variations in the segment/ellipse provided by the initial segmentation interface 111. This will generate different feature sets causing the reinforcement learning agent 154 to visit many states 170 before online mode starts. The variations include size and position change of the selected segment/ellipse.

Figure 10:
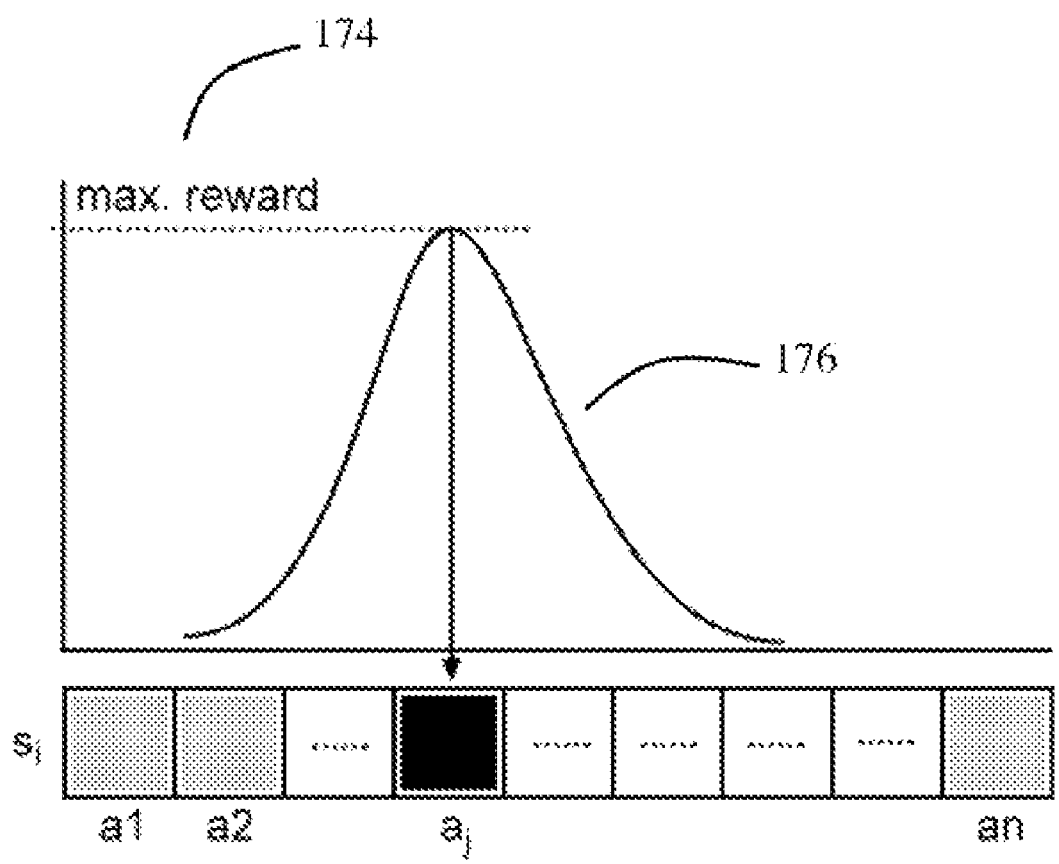
FIG. 10 is a chart of fuzzy rewarding values according to a reinforcement learning scheme for use with an image segmentation system according to an aspect of a preferred embodiment of the present invention.

3. Fuzzy Rewarding—instead of assigning a single value to each state-action pair, a Gaussian distribution 174 may be used to assign similar values to adjacent actions/thresholds (as seen in FIG. 10). This will generate values for actions in each state in a shorter time. Fuzzy rewarding in state $s_i$ and action $a_j$ is shown in FIG. 10. The action in focus will receive the highest or maximum reward 176 but its adjacent actions also receive partial rewards 176 using a Gaussian distribution 174 (also known as a Gaussian-shaped membership function).

4. Oppositional updating—Opposition-based learning can be used to expedite reinforcement learning as is more generally described in [TIZ05, TIZ06]. For every action a make additional update for its opposite action ă. Assuming that the eligible threshold range is $[T_{min}, T_{max}]$, then the opposite threshold ă can be given as $$\tilde{a} = \begin{cases} \max\left[T_{max} + T_{min} - a, a + \frac{T_{max} + T_{min}}{2}\right] & \text{if } a < \frac{T_{max} + T_{min}}{2} \\ T_{max}, T_{min} & \text{if } a = \frac{T_{max} + T_{min}}{2} \\ \min\left[T_{max} + T_{min} - a, a - \frac{T_{max} + T_{min}}{2}\right] & \text{if } a > \frac{T_{max} + T_{min}}{2} \end{cases}$$

Figure 11:
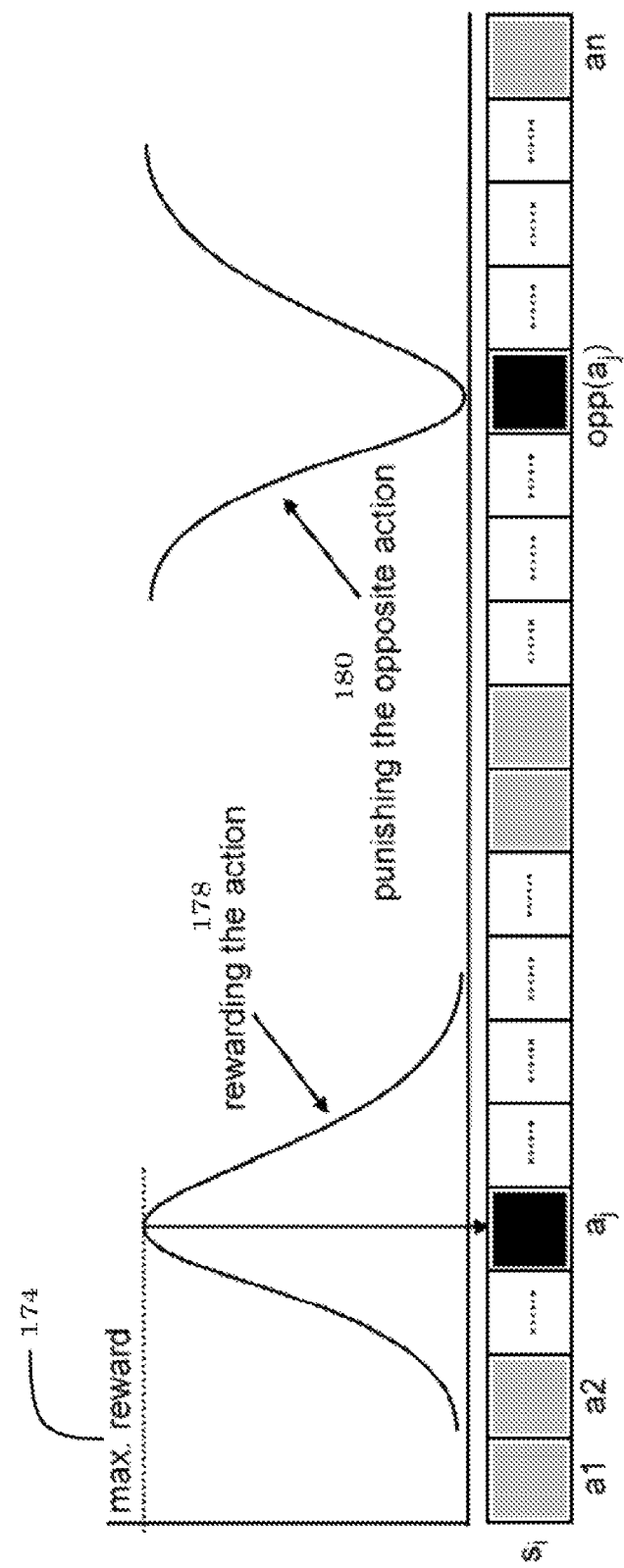
FIG. 11 is a chart of fuzzy rewarding and punishing values according to a reinforcement learning scheme for use with an image segmentation system according to an aspect of a preferred embodiment of the present invention.

The fuzzy rewarding can be applied to the opposite action as well (FIG. 11). Fuzzy rewarding in state $s_i$ and action $a_j$ is also shown in FIG. 11. The action 168 in focus will receive the maximum reward 174 but its adjacent actions also receive partial rewards 178 using a Gaussian distribution. At the same time the opposite action opp($a_j$) and its adjacent actions receive the opposite reward (=punishment 180).

Fuzzy Inference System

Figure 12:
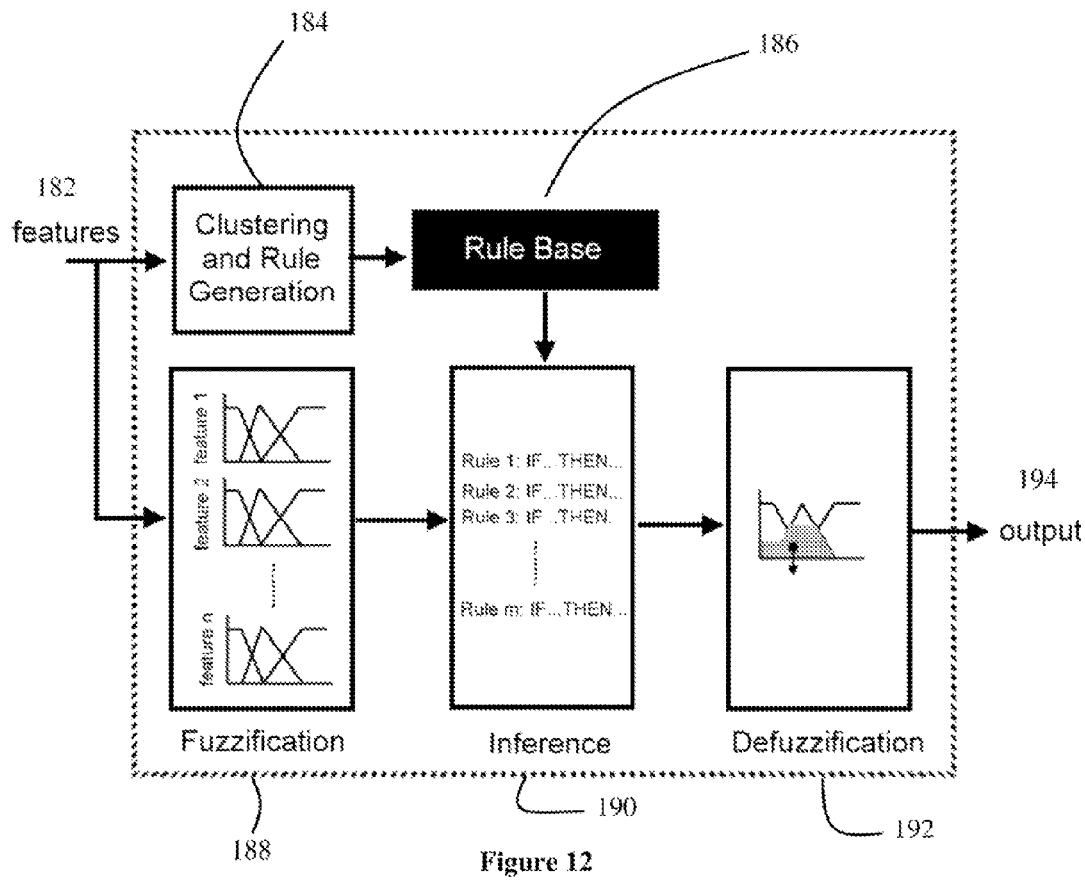
FIG. 12 is a simplified diagrammatic representation of a fuzzy inference scheme for use with an image segmentation system according to an alternative embodiment of the present invention.

The learning scheme 70 may alternatively be implemented by a fuzzy inference system. Fuzzy inference systems using the concept of linguistic variables have been largely in use to solve diverse problems as is generally described in [ZAD65, ZAD73, ZAD75]. A fuzzy inference system (FIS) consists of several components as depicted in FIG. 12. The FIS accepts features 182 extracted from the image and delivers an output 194 which is preferably the optimal threshold (but could be any other parameter controlling the segmentation).

Figure 13:
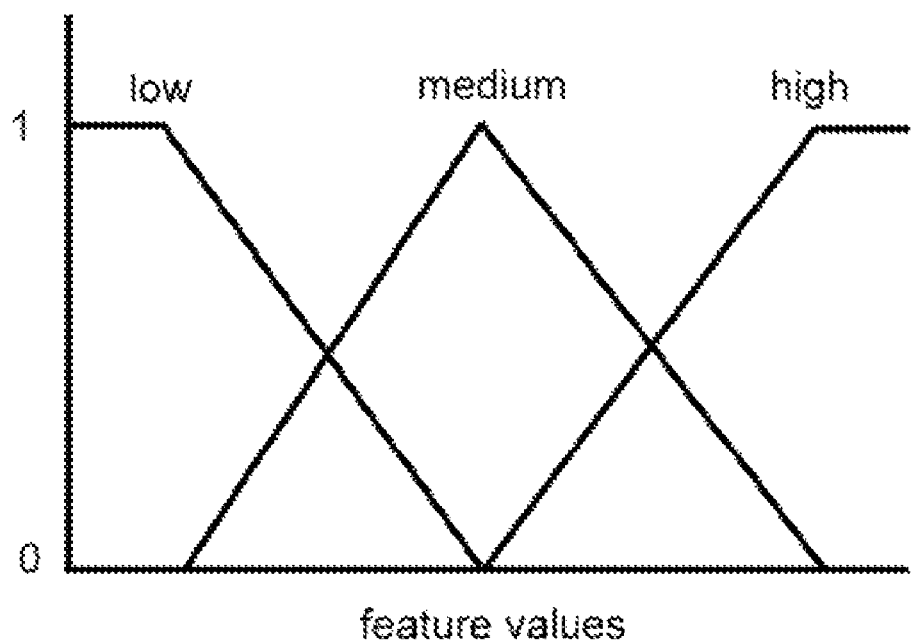
FIG. 13 is a chart showing example membership functions for use with the fuzzy inference scheme of FIG. 12.
Figure 13:
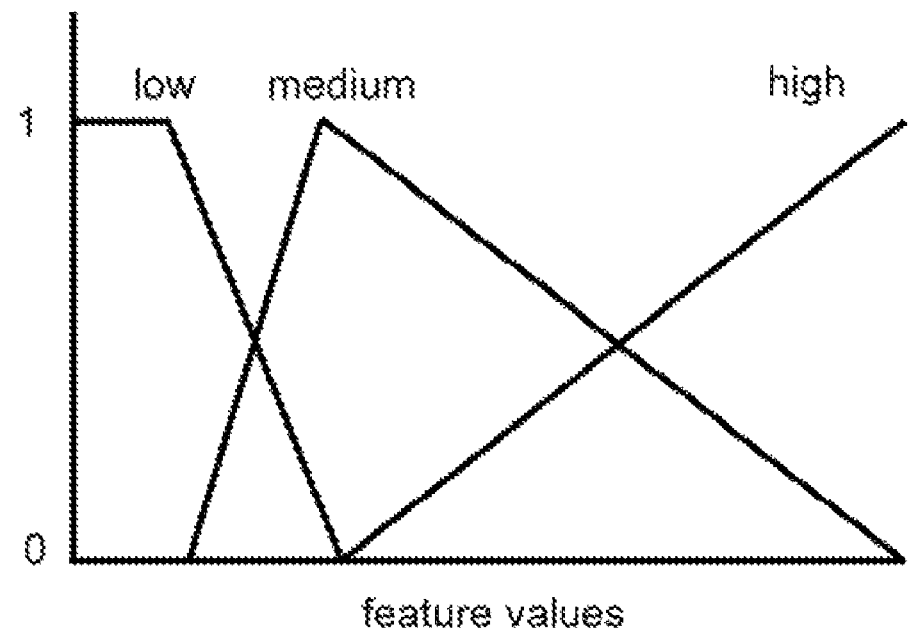

1. Clustering and Rule Generation (shown in FIG. 12 as 184)—the learning matrix 198 contains 4 features along with the optimal Output 194 (best threshold) for each telescoping window 150, as depicted in Table 4. A clustering algorithm such as fuzzy C-means (FCM) can be applied to the learning matrix 198 to extract membership functions and, subsequently, generate rules of the form "IF feature 1 is low AND feature 2 is medium AND feature 3 is low AND feature 4 is medium, THEN output is high". A "high" output means a high threshold regardless whether the membership function is defined in [0,1] or [0, 255] (or some other range). The terms "low", "medium" and "high" are membership functions as illustrated in FIG. 13. The collection of rules is referred to as a rule base 186.

2. Fuzzification (shown in FIG. 12 as 188)—Every feature will be assigned a number of membership values using the extracted membership functions. For instance for a homogeneity of H=0.8 membership values of [0, 0.1, 0.9] mean that this value is "low" with a membership degree of 0, "medium" with a membership degree of 0.1 and "high" with a membership degree of 0.9.

3. Inference (shown in FIG. 12 as 190)—All rules from the rule base 186 will be examined whether they fire (are applicable) and how strongly they fire (usually a number in [0,1]). This results in a combined membership function as the output 194 of the inference section (gray area in the "Defuzzification" block of FIG. 11).

4. Defuzzification (shown in FIG. 12 as 192)—The combined membership function will be defuzzified, meaning that a single number will be generated for the gray area in the "Defuzzification" block of FIG. 11. This value will be delivered as the output 194. Options for defuzzification will be apparent to those of skill in the art, and include centre of gravity, centroid and other well-established methods.

As seen in FIG. 12, the structure of a fuzzy inference system for observer-oriented segmentation includes a rule base which contains the threshold adjustment rules can be perpetually adjusted/re-created based on the observer feedback since every user feedback generates a new (online) gold image, new features and new optimal output.

As shown in FIG. 13, example general membership functions include (left-side of the FIG. 13) to fuzzify a given feature if 3 terms "low", "medium" and "high" are used. However, it is expected that the generated membership functions will be not symmetrically located (right-side of FIG. 13) due to the typically noisy nature of the image data.

In order to use a fuzzy inference system the system 20 needs to 1) define m membership functions for each input (for example 3 membership functions for each input as illustrated in FIG. 12; 2) define n membership functions for the output 194 (for example 3 membership functions for output 194 as illustrated in FIG. 12), 3) define or extract rules, and 4) select an inference mechanism.

Defining membership functions for the inputs: Each feature can be represented with at least 3 or more membership functions. The shape of the function is relatively insignificant; triangular (FIG. 7) or bell-shaped functions are generally suitable.

Defining membership functions for the output 194: The output 194 of the fuzzy system is the threshold $T_i$ to be used for weight calculation. A triangular membership function with fixed ends and flexible middle point, $\mu(T_i)=1$, can represent the output 194 (FIG. 5).

Defining or extracting rules: In some cases it may be possible to either generate all rules based on expert knowledge or add rules to an existing rule base 186. However, generally it is desirable to generate the rules from a features matrix, especially because these rules are being updated online as the observer works with system 20. The learning matrix 198 can be clustered using existing classification methods such as Fuzzy C-Means in order to generate fuzzy if-then rules for the 4 features. For example: IF the threshold T is high AND the homogeneity H is medium AND the homogeneity difference D is low AND the telescoping ratio R is medium, THEN threshold should be medium.

Selecting an inference mechanism: Both Mamdani [MAM75, MAM76, MAM77] or Tagaki-Sugeno [SUG85, TAK85] inference mechanisms can be employed to infer decisions for every image.

The online, perpetual learning capability for FIS can be achieved via re-generation of the rules 210 as the observer 40 works with the system 20 (see FIG. 14). For each new image that the system 20 segments and displays to the observer 40, the observer 40 either saves it without any change (if he is satisfied with the result) or edits the pixels/contour of the extracted object and then saves it. Since the features 204 can always be calculated upon saving the result by the observer 40 (changed or unchanged), a new row can be added to the learning matrix 198 for that case.

The online implementation of FIS using the learning matrix 198. Whereas in the offline mode 200 only the available n212 images are used to generate rules 208, in the online mode 202 an entire rule base 186 is re-generated 210 again when n+m, n+2m, n+3m, . . . 214 new images have been processed (m=3 in this example). The re-generation of rules 210 occurs in the background such that it does not affect the regular operation of the system (the observer 40 does not perceive the re-generation 210 process and will only observe its improving effect on the segmentation of subsequent images).

Neural Networks

Figure 15:
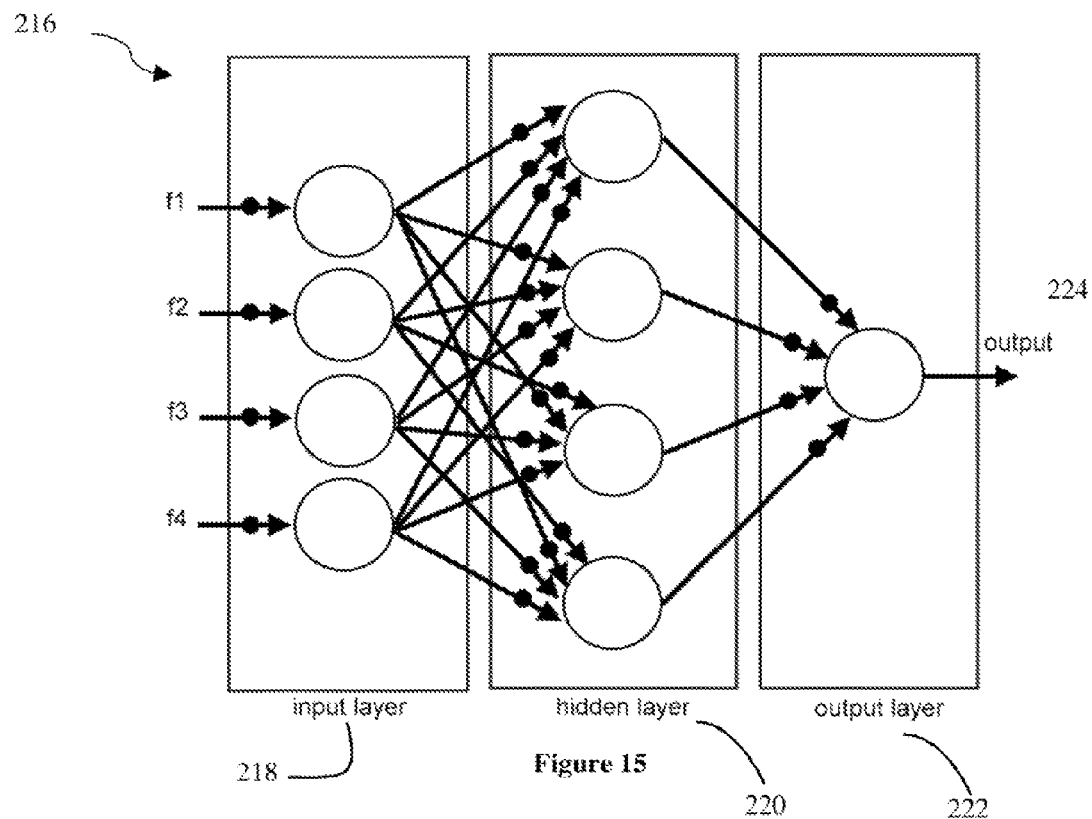
FIG. 15 is a simplified diagrammatic representation of an example neural network for use with an image segmentation system according to a further alternative embodiment of the present invention.

The learning scheme 70 may alternatively be implemented by a neural network 216. Neural networks 216 have proven to be quite capable of learning complex relationships provided enough learning samples are available. A neural network 216 (FIG. 15 is a connected architecture of processing units, called neurons 226 (FIG. 16), with weighted connections between them. The intelligence of the neural network 216 is stored in the weights of all connections and the architecture that makes up the entire network. By processing all training samples in the offline mode, the weights are adjusted such that the total error of the network is minimized. In FIG. 15, an input layer 218 is shown which is only accessible from the outside and accepts input, a hidden layer 220 is not accessible from the outside and does not provide output, and an output layer 222 which provides output. Each layer contains a certain number of neurons 226.

Figure 16:
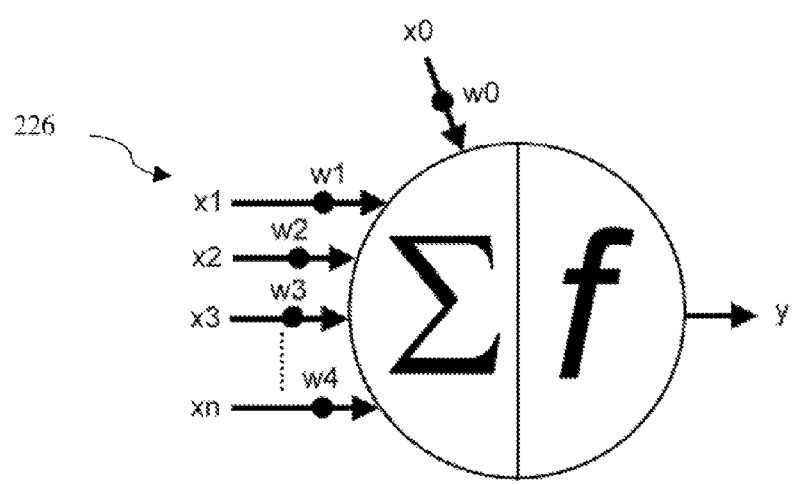
FIG. 16 is a simplified diagrammatic representation of a neuron for use with the neural network of FIG. 15.

As shown in FIG. 16, a neuron (processing unit) 226 calculates the output y by summing the weighted inputs (and a bias) and passing it through an activation function: $y=f(x_1w_1+x_2w_2+ \ldots +x_nw_n-x_0w_0)$.

In order to use a neural network 216 for the observer-oriented control of image segmentation, the system 20 needs to 1) determine the number of in- and outputs, 2) determine the architecture of the network, and 3) select a learning algorithm for the adjustment of the network's weights.

Determining the number of in- and outputs: for the example illustrated in FIGS. 14 and 15 there are 4 inputs (features T, H, D, R) and one output 224 (ideal threshold). All numbers can be normalized in [0,1].

Determining the network's architecture: Depending on the number of in- and outputs and also depending on the complexity of the segmentation for the given class of images, a customary trial and error approach may be required to fix the number of layers and neurons. In a preferred embodiment, a 4×8×1-network can provide good results.

Selecting a learning algorithm: The learning matrix 198 can serve as inputs of a feed-forward backpropagation neural net as is generally described in [BUR97] to learn the optimal threshold.

The online, perpetual learning capability for a neural network can be achieved via online re-training (with reference to FIG. 17). Since gathering features for every image, and since the observer 40 permanently saves/edits the results, the learning matrix 198 grows over time, the network 226 can be continuously re-trained on the modified or expanded learning matrix 198 to accommodate observer 40 preferences.

With reference to FIG. 17, there is shown the online implementation of a neural network 226 using the learning matrix 198. Whereas in the offline mode only the available nimages are used to train the network, in the online mode are re-trained the network again when n+m, n+2m, n+3m, . . . new images have been processed (m=3 in this sketch). The re-training of the network 226 occurs in the background such that it does not affect the regular operation of the system (the observer 40 may not perceive the re-generation process 210 and will only observe its improving effect on the segmentation of subsequent images).

To accelerate the learning the following measures may be taken:

1. Intensification of Offline Training—During the offline training, numerous cases for each image are created by purposeful variations in the initial segment 113 ellipse 144 rectangle 148 provided by the initial segmentation interface 111. This can be achieved by generating a number of segments/ellipses/rectangles via changing the size and location of the initial segment 113 (or ellipse 144 or rectangle 148, etc.). The term, "purposeful variations" refers to creating smaller/larger versions with upward/downward/rightward/leftward shifts that are in relationship with the image size on one side and with the size of the initial segment 113 on the other side. This will generate numerous feature sets for the neural network. The variations include size and position change of the selected segment/ellipse.

2. Delayed Learning Activation—For cases where not enough training samples during the offline mode are available, the learning is postponed until a sufficient number of images have been processed online and the Learning Matrix has reached the necessary size. Subsequently the network can be trained for the first time and continue the perpetual online re-training as depicted in FIG. 17. In order to recognize situations of limited training samples, we 1) analyze the modality/case at hand and estimate a minimum number of samples to start, 2) run k-fold cross-validations and compare the training accuracy $A_{Train}$ with the recall accuracy $A_{Recall}$. If $A_{Train}$ is rather low (e.g. <70%) and/or the difference $|A_{Train}-A_{Recall}|$ is too large (e.g. >15%), then the learning activation is postponed.

3. Opposite Transfer Functions—probabilistic switching may be used to opposite transfer functions in order to accelerate the convergence of the backpropagation network as is generally described in [VEN06]. The transfer function of randomly selected neurons are inverted/flipped to generate opposite output. The probability and number of neurons to use opposite transfer function is low, e.g. one neuron at a time with probability of 3%.

Learning Behaviour

Figure 18:
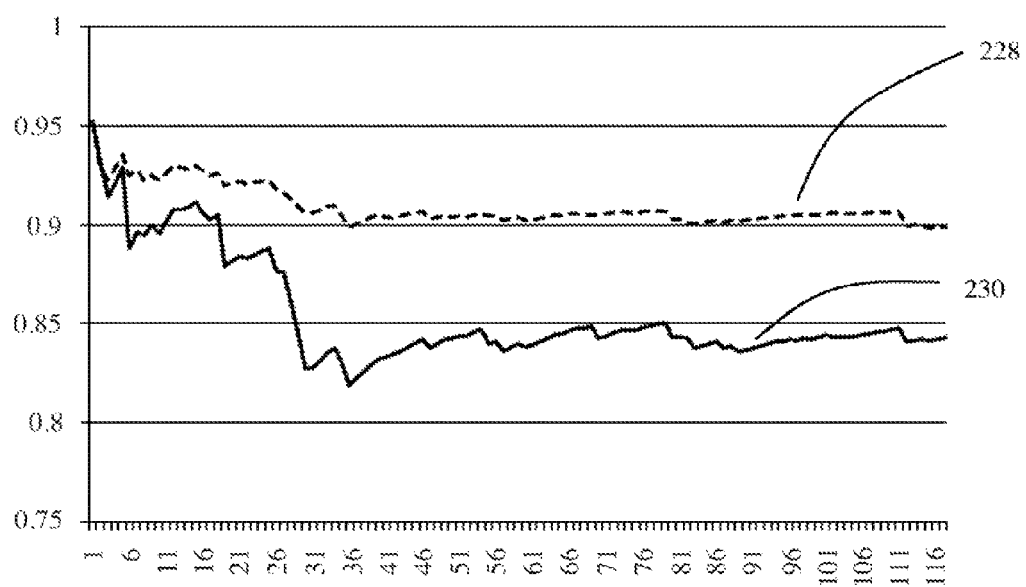
FIG. 18 is a chart showing the performance of an image segmentation system according to an aspect of a preferred embodiment of the present invention, with observer-oriented learning enabled and disabled.

FIG. 18 shows the learning behaviour of the proposed system (dashed curve shown as 228 in FIG. 18) compared to when no observer-oriented learning is involved (solid curve shown as 230 in FIG. 18). Over time the accuracy increases as the results generated by the system and method of the present invention become more agreeable to the observer 40. Comparing the average accuracy (area overlap) of the exemplary processing chain with online learning (dashed curve) and without online learning (solid curve). The observer-oriented online learning not only increases the accuracy but also decreases the standard deviation resulting in more consistent results over time.

Conflicts

An aspect of the present invention provides a module to recognize and report a conflict between the observer's current segmentation selection and the accumulated learned knowledge residing in the system 10. If there is a conflict, that is, a situation where the generated feature vector together with an optimal threshold is different from existing data in the learning matrix 198, then an aspect of the present invention provides a mechanism to recognize and report on this conflict. For example, if there is an existing row in the learning matrix 198 and then a new row is received with very similar features but significantly different output as given in TABLE 6 (in which all values normalized). As apparent from Table 6, whereas all features are almost identical, the outputs are significantly different:

$$\Sigma_{i=1}^{4}|\text{Feature}_{old}(i)-\text{Feature}_{new}(i)| \rightarrow 0 \text{ AND } |T_{old}*-T_{new}*| \rightarrow 1 \Rightarrow \text{CONFLICT!}$$

A case like this can occur, among others, when the observer 40 edits the segment drastically different compared to the previous similar cases. This may have several reasons, one of them could be that the observer 40 is making a mistake by employing the observer's past preferences as the comparison measure. In any event, a warning may be displayed indicating that the result of the editing conflicts the old (existing) knowledge and ask the observer 40 whether 1) to overwrite old (existing) knowledge (hence the existing knowledge was wrong), or 2) continue with the existing knowledge (hence the new knowledge is invalid). If the latter case is chosen by the observer it means that he had made a mistake, maybe due to fatigue or visual uncertainties. To assist him in this regard, object/its contour may be displayed based on the existing knowledge such that he can visually compare and make a more certain decision.

Figure 21:
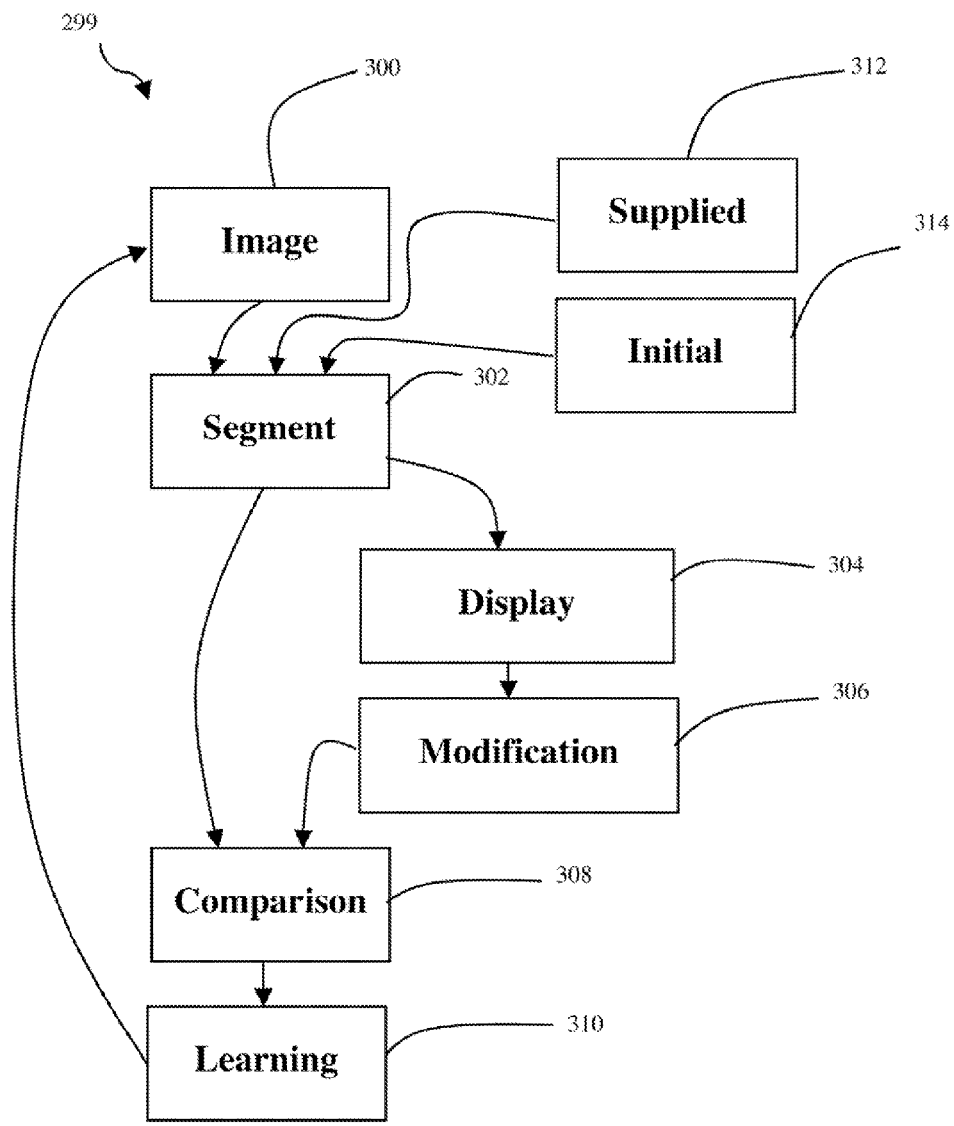
FIG. 21 is a simplified flow chart of an image segmentation method according to an aspect of the preferred embodiment.

With reference now to FIG. 21, the computer-implemented method 299 of segmenting images according to a preferred embodiment of the invention receives an image (shown as step 300 in FIG. 21) and receives a segment in relation to the image (shown as step 302 in FIG. 21). This initial segment 113 may be supplied by the observer 40 via third party software (shown as step 312 in FIG. 21), or it may be generated from an initial segmentation interface 111 described above (shown as step 314 in FIG. 21). The method then displays the image and the segment to the observer 40 (shown as step 304 in FIG. 21) and receives from the observer 40 a modification to the generated segment (shown as step 306). When a second image is received, the second segment will be responsive to the modification received from the observer 40 due to, among other things, steps 308 and 310 in FIG. 21 (shown as steps 300, 308 and 310 in FIG. 21). The method 299 may also process offline images as follows: receiving an offline image, containing a segment provided by an observer (shown as step 300 in FIG. 21); predicting a segment for the offline image using a learning scheme (shown as step 302 in FIG. 21); comparing the predicted and provided segments for the offline image (shown as step 308 in FIG. 21); and updating the learning scheme with the result of the comparison (shown as step 310 in FIG. 21).

In another aspect of the invention, the computer-implemented method of segmenting images receives an image; receives at least one initial segmentation parameter (such as a threshold value); receives an initial segment 113 in relation to the image from the at least one initial segmentation parameter; receives at least one segment feature in relation to the initial segment; provides the at least one initial segmentation parameter and the at least one segment feature to a learning model, said learning model thereby generates a revised at least one segmentation parameter; generates a revised segment from the revised at least one segmentation parameter; displays the image and the revised segment; receives observer feedback 60 in relation to the revised segment to create a modified segment; recalculates the at least one segmentation parameter from the modified segment; and updates the learning model from the recalculated at least one segmentation parameter, the at least one segment feature, and the at least one initial segmentation parameter.

Figure 22:
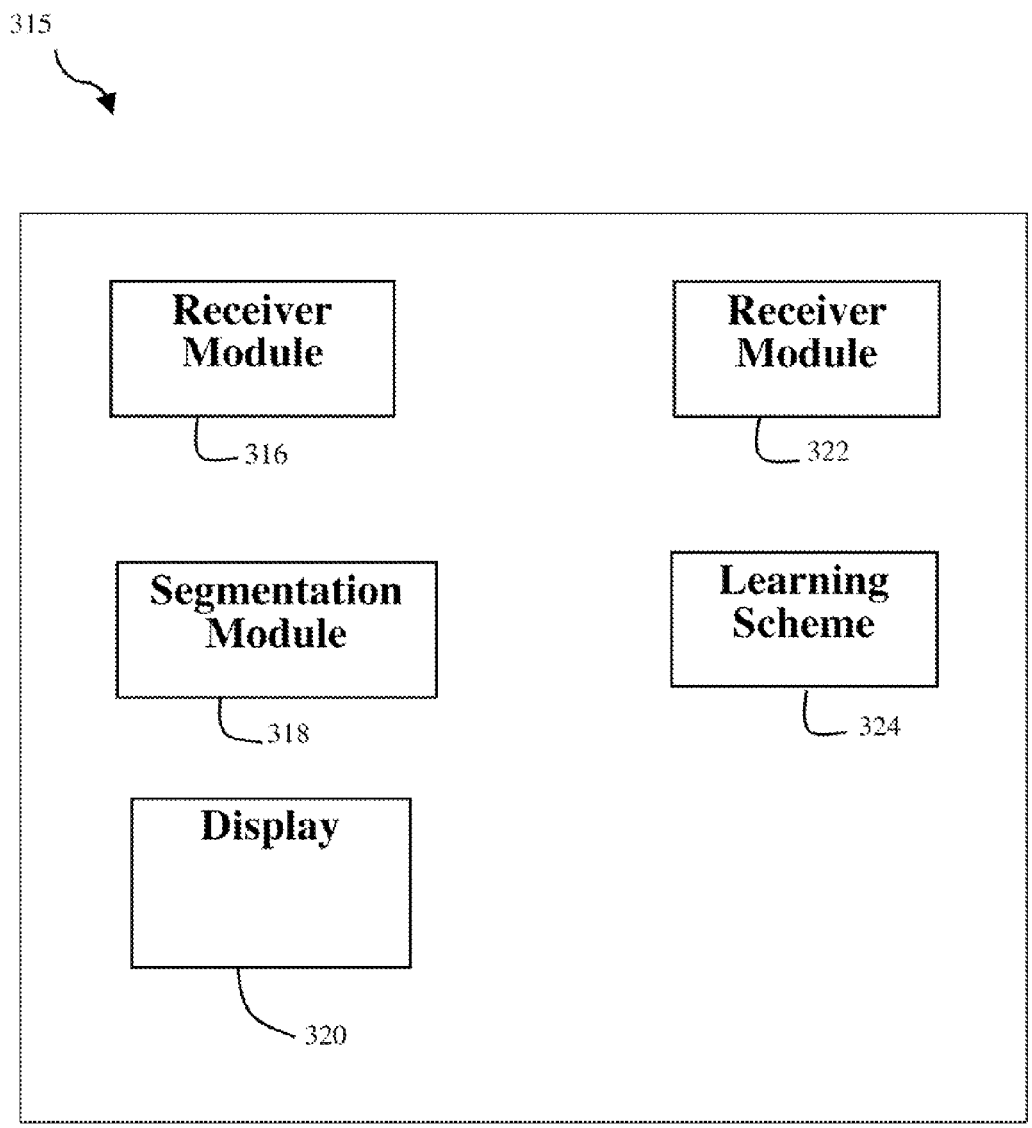
FIG. 22 is a simplified box diagram showing the modules of an image segmentation system according to an aspect of the preferred embodiment.

With reference to FIG. 22, the system for segmenting images 315 according to a preferred embodiment of the invention contains a receiver module 316 for receiving an image; a segmentation module 318 for receiving a segment in relation to the image; a display 320, for displaying to an observer 40 the image and the generated segment; a receiver module 322, for receiving from an observer 40 a modification to the generated segment; wherein said segmentation module 318 is responsive to the modification received from the observer 40.

An image segmentation system 315 of a preferred embodiment of the invention comprises means for drawing an image segment based on at least one segmentation parameter (shown as segmentation module 318 in FIG. 22); an observer display (shown as display 320 in FIG. 22) for displaying the drawn segment; an observer feedback interface (shown as receiver module 322 in FIG. 22); and a learning scheme 324 which takes input from the observer feedback interface and communicates with the means for drawing an image segment (shown as segmentation module 318 in FIG. 22) to permit adjustment of the at least one segmentation parameter.

According to an aspect of the invention, the learning scheme 324 of the image segmentation system is provided with a knowledge base 130. According to this aspect of the invention, the knowledge base 130 may be initially created by: receiving at least one offline image containing a segment provided by an observer 40; predicting a segment for the at least one offline image using the learning scheme 324; comparing the predicted and provided segments for the at least one offline image; and updating the learning scheme 324 with the result of the comparison.

According to an aspect of one preferred embodiment of the invention, the learning scheme 324 of the image segmentation system comprises a reinforcement learning scheme. More preferably, the reinforcement learning scheme comprises a Q-learning scheme which generates the at least one segmentation parameter from at least one image feature and provides a reward or a punishment to itself in response to an action comprising a change of the at least one segmentation parameter.

According to an aspect of an alternative preferred embodiment of the invention, the learning scheme 324 of the image segmentation system comprises a fuzzy inference system. More preferably, the fuzzy inference system re-generates a rule base to output the at least one segmentation parameter from at least one image feature.

According to an aspect of a further alternative preferred embodiment of the invention, the learning scheme 324 of the image segmentation system comprises a neural network. More preferably, the neural network re-trains one or more aspects of the neural network to output the at least one segmentation parameter from at least one image feature.

According to an aspect of the preferred embodiment of the invention, the image segmentation system 315 further comprises a means to generate m telescoping windows from an initial segment or point to calculate image features. Preferably, the means to generate m telescoping windows starts with the initial segment or point and constructs enlarged windows until a maximum window size is reached.

In a preferred embodiment, the at least one image features comprise the following image features: a threshold $T_m$ in each $m^{th}$ telescoping window; a homogeneity of each $m^{th}$ telescoping window; a difference $D_m$ between the homogeneity of each $m^{th}$ telescoping window and a homogeneity of the initial segment or point; and a ratio of average gray-levels for each telescoping window and an average of gray-levels of the initial segment or point.

According to an aspect of the preferred embodiment of the invention, the image is a medical diagnostic image.

According to a another aspect of the preferred embodiment of the invention, the means for drawing an image segment comprise an interface to permit the observer 40 to generate an image segment over a display comprising: tracking an observer-operated pointer over an image; analysing the image in a vicinity of the pointer; displaying a segment in the vicinity of the pointer on the display responsive to the analysing step; and receiving a segment selection from the observer 40.

In an aspect of the invention, the at least one segmentation parameter includes a threshold value. Alternatively, the means for drawing an image segment are based on a single segmentation parameter. Furthermore, the single parameter may be a threshold value.

According to another aspect of the preferred embodiment of the invention, the image segmentation system may further comprise a means to identify a conflict between the learning scheme and the modification; and means to prompt the observer to overwrite the learning scheme.

Figure 19:
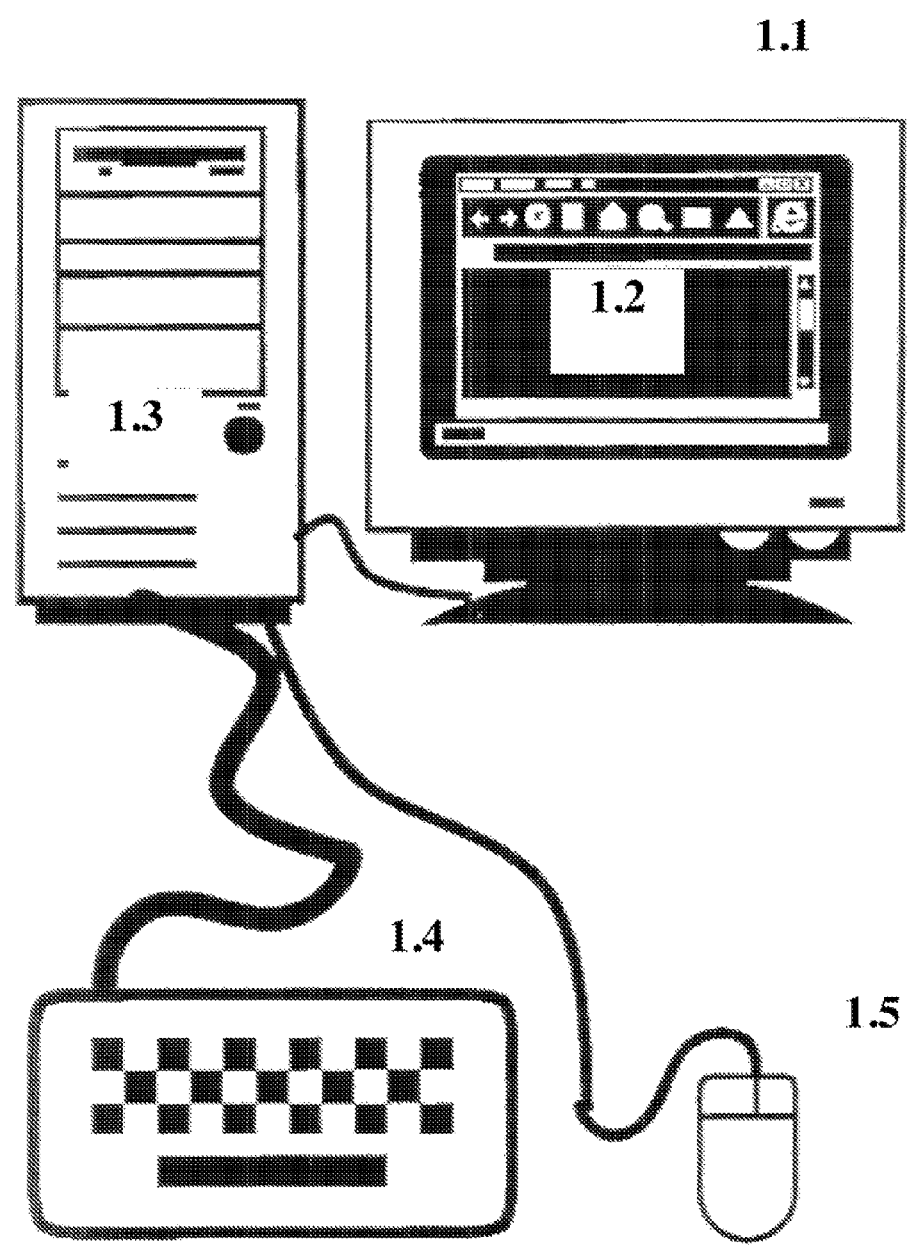
FIG. 19 shows a basic computing system on which the invention can be practiced.

FIG. 19 shows a basic computer system on which the invention might be practiced. The computer system comprises of a display device (1.1) with a display screen (1.2). Examples of display device are Cathode Ray Tube (CRT) devices, Liquid Crystal Display (LCD) Devices etc. The computer system can also have other additional output devices like a printer. The cabinet (1.3) houses the additional essential components of the computer system such as the microprocessor, memory and disk drives. In a general computer system the microprocessor is any commercially available processor of which x86 processors from Intel and 680X0 series from Motorola are examples. Many other microprocessors are available. The computer system could be a single processor system or may use two or more processors on a single system or over a network. The microprocessor for its functioning uses a volatile memory that is a random access memory such as dynamic random access memory (DRAM) or static memory (SRAM). The disk drives are the permanent storage medium used by the computer system. This permanent storage could be a magnetic disk, a flash memory and a tape. This storage could be removable like a floppy disk or permanent such as a hard disk. Besides this the cabinet (1.3) can also house other additional components like a Compact Disc Read Only Memory (CD-ROM) drive, sound card, video card etc. The computer system also has various input devices like a keyboard (1.4) and a mouse (1.5). The keyboard and the mouse are connected to the computer system through wired or wireless links. The mouse (1.5) could be a two-button mouse, three-button mouse or a scroll mouse. Besides the said input devices there could be other input devices like a light pen, a track ball etc. The microprocessor executes a program called the operating system for the basic functioning of the computer system. The examples of operating systems are UNIX, WINDOWS and DOS. These operating systems allocate the computer system resources to various programs and help the users to interact with the system. It should be understood that the invention is not limited to any particular hardware comprising the computer system or the software running on it.

Figure 20:
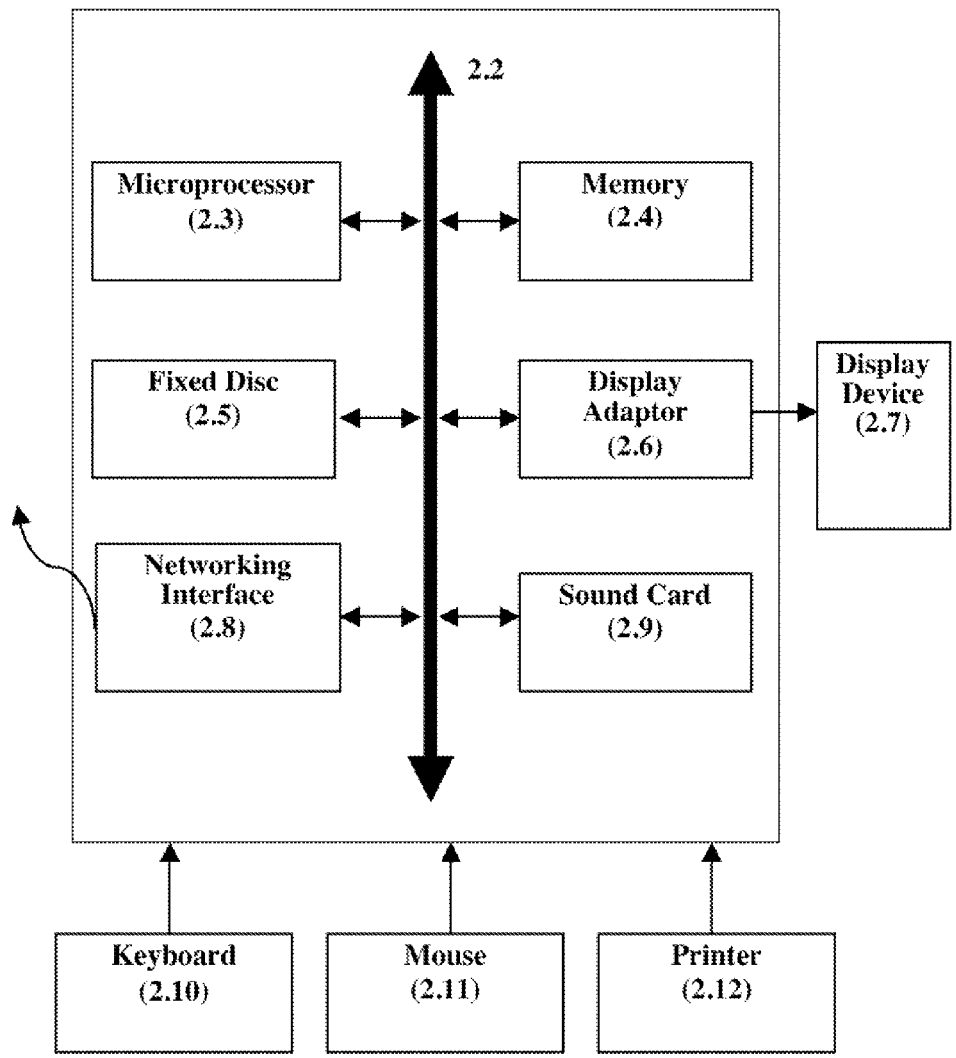
FIG. 20 shows the internal structure of the computing system of FIG. 18.

FIG. 20 shows the internal structure of the general computer system of FIG. 19. The computer system (2.1) consists of various subsystems interconnected with the help of a system bus (2.2). The microprocessor (2.3) communicates and controls the functioning of other subsystems. Memory (2.4) helps the microprocessor in its functioning by storing instructions and data during its execution. Fixed Drive (2.5) is used to hold the data and instructions permanent in nature like the operating system and other programs. Display adapter (2.6) is used as an interface between the system bus and the display device (2.7), which is generally a monitor. The network interface (2.8) is used to connect the computer with other computers on a network through wired or wireless means. The computer system might also contain a sound card (2.9). The system is connected to various input devices like keyboard (2.10) and mouse (2.11) and output devices like printer (2.12). Various configurations of these subsystems are possible. It should also be noted that a system implementing the present invention might use less or more number of the subsystems than described above.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

REFERENCES

[BUR97] LAURA BURKE1 and JAMES P. IGNIZIO, A practical overview of neural networks. Journal of Intelligent Manufacturing (1997) 8, 157-165.
[GOM99] A. F. Gomez-Skarmeta, M. Delgado, M. A. Vila, A bout the use of fuzzy clustering techniques for fuzzy model identification, Fuzzy Sets and Systems 106, pp. 179-188, 1999.
[GON07] Rafael C. Gonzalez, Richard Eugene Woods, Digital image processing, Edition: 3, Prentice Hall.
[KAE96] Leslie Pack Kaelbling, Michael L. Littman, Andrew W. Moore, Reinforcement Learning: A Survey, Journal of Artificial Intelligence Research 4 (1996) 237-285.
[NOW98] A. Nowe, Sugeno, Mamdani, and Fuzzy Mamdani Controllers Put in a Uniform Interpolation Framework. INTERNATIONAL JOURNAL OF INTELLIGENT SYSTEMS, VOL. 13, 243]256, 1998.
[OTS79] Otsu, N., "A threshold selection method from gray-level histograms". IEEE Transactions on Systems, Man and Cybernetics, vol. 9, pp. 62-66, 1979.
[TIZ05] Tizhoosh, H. R., Opposition-Based Learning: A New Scheme for Machine Intelligence. Proceedings of International Conference on Computational Intelligence for Modelling Control and Automation—CIMCA'2005, Vienna—Austria, vol. I, pp. 695-701.
[TIZ06] Tizhoosh, H. R., Opposition-Based Reinforcement Learning. Journal of Advanced Computational Intelligence and Intelligent Informatics (JACIII), vol. 10, no. 5, pp. 578-585, 2006.
[VEN06] Ventresca, M., Tizhoosh, H. R., Improving the Convergence of Backpropagation by Opposite Transfer Functions. Proceedings of IEEE International Joint Conference on Neural Networks part of IEEE World Congress on Computational Intelligence, Vancouver, Canada, pp. 9527-9534, 2006.
[WAT92] Christopher J. C. H. Watkins and Peter Dayan. Q-learning. Machine Learning, 8(3):279-292, 1992.
[YIN99] Hao Ying, Yongsheng Ding, Shaokuan Li, and Shihuang Shao, Comparison of Necessary Conditions for Typical Takagi-Sugeno and Mamdani Fuzzy Systems as Universal Approximators. IEEE TRANSACTIONS ON SYSTEMS, MAN, AND CYBERNETICS—PART A: SYSTEMS AND HUMANS, VOL 29, NO. 5, September 1999.

The invention claimed is:
1. A computer-implemented method of segmenting images comprising the steps of:
receiving a first image;
receiving a first segment in relation to the first image;
displaying to an observer the first image and the first segment;
receiving from an observer a modification to the first segment;
receiving a second image; and
generating a second segment in relation to the second image, said generation responsive to the modification received from the observer, said generation using a learning scheme comprising a fuzzy inference system to optimize at least one segmentation parameter, in which the fuzzy inference system re-generates a rule base to output the at least one segmentation parameter from at least one image feature.

2. A computer-implemented method of segmenting images comprising the steps of:
  receiving a first image;
  receiving a first segment in relation to the first image;
  displaying to an observer the first image and the first segment;
  receiving from an observer a modification to the first segment;
  receiving a second image; and
  generating a second segment in relation to the second image, said generation responsive to the modification received from the observer, said generation using a learning scheme comprising a neural network to optimize at least one segmentation parameter, in which the neural network re-trains one or more aspects of the neural network to output the at least one segmentation parameter from at least one image feature.

3. A computer-implemented method of segmenting images according to any one of claims 1 and 2, further comprising the step of generating m telescoping windows from an initial segment or point to calculate the at least one image feature.

4. A computer-implemented method of segmenting images according to claim 3, in which the step of generating m telescoping windows starts with the initial segment or point and constructs enlarged windows until a maximum window size is reached.

5. A computer-implemented method of segmenting images according to claim 3, in which the at least one image features comprise:
  a. a threshold $T_m$ each $m^{th}$ telescoping window;
  b. a homogeneity of each $m^{th}$ telescoping window;
  c. a difference $D_m$ between the homogeneity of each $m^{th}$ telescoping window and a homogeneity of the initial segment or point; and
  d. a ratio of average gray-levels for each telescoping window and an average of gray-levels of the initial segment or point.

6. A computer-implemented method of segmenting images comprising the steps of:
  receiving a first image;
  receiving a first segment in relation to the first image;
  displaying to an observer the first image and the first segment;
  receiving from an observer a modification to the first segment;
  receiving a second image;
  generating a second segment in relation to the second image, said generation responsive to the modification received from the observer, said generation using a learning scheme to optimize at least one segmentation parameter;
  identifying a conflict between the learning scheme and the modification; and
  prompting the observer to overwrite the learning scheme.

7. A system for segmenting images comprising:
  a receiver module for receiving an image;
  a segmentation module for receiving a segment in relation to the image;
  a display for displaying to an observer the image and a generated segment; and
  a receiver module for receiving from an observer a modification to the generated segment,
  wherein said segmentation module is responsive to the modification received from the observer, and
  wherein said segmentation module uses a learning scheme comprising a fuzzy inference system to optimize at least one segmentation parameter, in which the fuzzy inference system re-generates a rule base to output the at least one segmentation parameter from at least one image feature.

8. A system for segmenting images comprising:
  a receiver module for receiving an image;
  a segmentation module for receiving a segment in relation to the image;
  a display for displaying to an observer the image and a generated segment; and
  a receiver module for receiving from an observer a modification to the generated segment,
  wherein said segmentation module is responsive to the modification received from the observer, and
  wherein said segmentation module uses a learning scheme comprising a neural network to optimize at least one segmentation parameter, in which the neural network re-trains one or more aspects of the neural network to output the at least one segmentation parameter from at least one image feature.

9. A system for segmenting images according to any one of claims 7 and 8, further comprising a means to generate m telescoping windows from an initial segment to calculate the at least one image feature.

10. A computer-implemented method of segmenting images according to claim 9, in which the means to generate m telescoping windows starts with the initial segment or point and constructs enlarged windows until a maximum window size is reached.

11. A computer-implemented method of segmenting images according to claim 9, in which the at least one image features comprise:
  a. a threshold $T_m$ in each $m^{th}$ telescoping window;
  b. a homogeneity of each $m^{th}$ telescoping window;
  c. a difference $D_m$ between the homogeneity of each $m^{th}$ telescoping window and a homogeneity of the initial segment or point; and
  d. a ratio of average gray-levels for each telescoping window and an average of gray-levels of the initial segment or point.

12. A system for segmenting images comprising:
  a receiver module for receiving an image;
  a segmentation module for receiving a segment in relation to the image and using a learning scheme to optimize at least one segmentation parameter;
  a display for displaying to an observer the image and a generated segment;
  a receiver module for receiving from an observer a modification to the generated segment, said segmentation module being responsive to the modification received from the observer;
  a means to identify a conflict between the learning scheme and the modification; and
  means to prompt the observer to overwrite the learning scheme.

13. An image segmentation system comprising:
  means for drawing an image segment based on at least one segmentation parameter;
  an observer display, for displaying the drawn segment;
  an observer feedback interface; and
  a learning scheme, provided with a knowledge base, which takes input from the observer feedback interface and communicates with the means for drawing to permit adjustment of the at least one segmentation parameter, wherein the knowledge base is initially created by:
- receiving at least one offline image, containing a segment provided by an observer;
- predicting a segment for the at least one offline image using the learning scheme;
- comparing the predicted and provided segments for the at least one offline image; and
- updating the learning scheme with the result of the comparison.

14. An image segmentation system comprising:
- means for drawing an image segment based on at least one segmentation parameter;
- an observer display, for displaying the drawn segment;
- an observer feedback interface; and
- a learning scheme, comprising a fuzzy inference system, which takes input from the observer feedback interface and communicates with the means for drawing to permit adjustment of the at least one segmentation parameter, in which the fuzzy inference system re-generates a rule base to output the at least one segmentation parameter from at least one image feature.

15. An image segmentation system comprising:
- means for drawing an image segment based on at least one segmentation parameter;
- an observer display, for displaying the drawn segment;
- an observer feedback interface; and
- a learning scheme, comprising a neural network, which takes input from the observer feedback interface and communicates with the means for drawing to permit adjustment of the at least one segmentation parameter, in which the neural network re-trains one or more aspects of the neural network to output the at least one segmentation parameter from at least one image feature.

16. An image segmentation system according to any one of claims 14 and 15, further comprising a means to generate m telescoping windows from an initial segment or point to calculate the at least one image feature.

17. An image segmentation system of segmenting images according to claim 16, in which the means to generate m telescoping windows starts with the initial segment or point and constructs enlarged windows until a maximum window size is reached.

18. An image segmentation system according to claim 16, in which the at least one image features comprise:
a. a threshold $T_m$ in each $m^{th}$ telescoping window;
b. a homogeneity of each $m^{th}$ telescoping window;
c. a difference $D_m$ between the homogeneity of each $m^{th}$ telescoping window and a homogeneity of the initial segment or point; and
d. a ratio of average gray-levels for each telescoping window and an average of gray-levels of the initial segment or point.

19. An image segmentation system comprising:
- means for drawing an image segment based on at least one segmentation parameter;
- an observer display, for displaying the drawn segment;
- an observer feedback interface; and
- a learning scheme which takes input from the observer feedback interface and communicates with the means for drawing to permit adjustment of the at least one segmentation parameter,
- wherein the means for drawing an image segment comprise an interface to permit the observer to generate an image segment over a display comprising:
  a. tracking an observer-operated pointer over an image;
  b. analysing the image in a vicinity of the pointer;
  c. displaying a segment in the vicinity of the pointer on the display responsive to the analysing step; and
  d. receiving a segment selection from the observer.

20. An image segmentation system comprising:
- means for drawing an image segment based on a single segmentation parameter;
- an observer display, for displaying the drawn segment;
- an observer feedback interface; and
- a learning scheme which takes input from the observer feedback interface and communicates with the means for drawing to permit adjustment of the at least one segmentation parameter.

21. An image segmentation system according to claim 20 in which the single segmentation parameter is a threshold value.

22. An image segmentation system comprising:
- means for drawing an image segment based on at least one segmentation parameter;
- an observer display, for displaying the drawn segment;
- an observer feedback interface;
- a learning scheme which takes input from the observer feedback interface and communicates with the means for drawing to permit adjustment of the at least one segmentation parameter;
- means to identify a conflict between the learning scheme and the modification; and
- means to prompt the observer to overwrite the learning scheme.

23. A computer-implemented method of segmenting images comprising the steps of:
a. Receiving an image;
b. Receiving at least one initial segmentation parameter;
c. Receiving an initial segment in relation to the image from the at least one initial segmentation parameter;
d. Receiving at least one segment feature in relation to the initial segment;
e. Providing the at least one initial segmentation parameter and the at least one segment feature to a learning model, said learning model thereby generating a revised at least one segmentation parameter;
f. Generating a revised segment from the revised at least one segmentation parameter;
g. Displaying the image and the revised segment;
h. Receiving observer feedback in relation to the revised segment to create a modified segment;
i. Recalculating the at least one segmentation parameter from the modified segment;
j. Updating the learning model from the recalculated at least one segmentation parameter, the at least one segment feature, and the at least one initial segmentation parameter.

24. A computer-implemented method of segmenting images according to claim 23 further comprising the steps of:
a. Generating from the image at least one initial segmentation parameter;
b. Generating an initial segment in relation to the image from the at least one segmentation parameter; and
c. Generating at least one segment feature in relation to the initial segment.

25. A computer-implemented method of segmenting images according to claim 24 further comprising:
a. Receiving an offline image, containing a segment provided by an observer;
b. Predicting a segment for the offline image using the learning model;

c. Comparing the predicted and provided segments for the offline image; and d. Updating the learning model with the result of the comparison.

26. A computer-implemented method of segmenting images according to claim 24 in which the generating steps all involve an automated algorithm.

27. A computer-implemented method of segmenting images according to claim 23 further comprising the steps of:

a. Storing the recalculated at least one segmentation parameter, the at least one segment feature, and the at least one initial segmentation parameter.

28. A computer-implemented method of segmenting images according to claim 24 in which the generating an initial segment step involves segmenting an image over a display comprising the steps of:

a. tracking an observer-operated pointer over an image;
b. analysing the image in a vicinity of the pointer;
c. displaying a segment in the vicinity of the pointer on the display responsive to the analysing step; and
d. receiving a segment selection from the observer.

29. A computer-implemented method of segmenting images according to claim 23 in which the image is a medical diagnostic image.

30. A computer-implemented method of segmenting images according to claim 23 in which the image is a member of a group and the learning model is oriented to the group.

31. A computer-implemented method of segmenting images according to claim 30 where the group has an observer, an imaging modality and a case type.

32. A computer-implemented method of segmenting images according to claim 23 in which the learning model comprises a reinforcement learning model.

33. A computer-implemented method of segmenting images according to claim 32 in which the reinforcement learning model comprises a Q-learning model which generates the at least one segmentation parameter from at least one image feature and provides a reward or a punishment to itself in response to an action comprising a change of the at least one segmentation parameter.

34. A computer-implemented method of segmenting images according to claim 23 in which the learning model comprises a fuzzy inference system.

35. A computer-implemented method of segmenting images according to claim 34 in which the fuzzy inference system re-generates a rule base to output the at least one segmentation parameter from at least one image feature.

36. A computer-implemented method of segmenting images according to claim 23 in which the learning model comprises a neural network.

37. A computer-implemented method of segmenting images according to claim 36 in which the neural network re-trains one or more aspects of the neural network to output the at least one segmentation parameter from at least one image feature.

38. A computer-implemented method of segmenting images according to any one of claims 33, 35, and 37, further comprising the step of generating m telescoping windows to calculate the at least one image feature.

39. A computer-implemented method of segmenting images according to claim 38, in which the step of generating m telescoping windows starts with the initial segment or point and constructs enlarged windows until a maximum window size is reached.

40. A computer-implemented method of segmenting images according to claim 38, in which the at least one image features comprise:

a. a threshold $T_m$ in each $m^{th}$ telescoping window;
b. a homogeneity of each $m^{th}$ telescoping window;
c. a difference $D_m$ between the homogeneity of each $m^{th}$ telescoping window and a homogeneity of the initial segment or point; and
d. a ratio of average gray-levels for each telescoping window and an average of gray-levels of the initial segment or point.

41. A computer-implemented method of segmenting images according to claim 23 in which the at least one segmentation parameter includes a threshold value.

42. A computer-implemented method of segmenting images according to claim 23 in which the there is a single segmentation parameter.

43. A computer-implemented method of segmenting images according to claim 42 in which the single segmentation parameter is a threshold value.

44. A computer-implemented method of segmenting images according to claim 23 further comprising the steps of:

a. Identifying a conflict between the learning model and the modified segment; and
b. Prompting the observer to overwrite the learning model.

* * * * *